(12) United States Patent
Kubo

(10) Patent No.: US 7,995,887 B2
(45) Date of Patent: Aug. 9, 2011

(54) LIQUID CRYSTAL DISPLAY DEVICE AND ELECTRONIC DEVICE USING THE SAME

(75) Inventor: Masumi Kubo, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 421 days.

(21) Appl. No.: 11/997,563

(22) PCT Filed: Jul. 31, 2006

(86) PCT No.: PCT/JP2006/315142
§ 371 (c)(1),
(2), (4) Date: Feb. 1, 2008

(87) PCT Pub. No.: WO2007/015458
PCT Pub. Date: Feb. 8, 2007

(65) Prior Publication Data
US 2010/0157213 A1 Jun. 24, 2010

(30) Foreign Application Priority Data
Aug. 3, 2005 (JP) .................................. 2005-225879

(51) Int. Cl.
*G02F 1/1335* (2006.01)
*G02F 1/1343* (2006.01)
(52) U.S. Cl. ........................................ 385/114; 385/144
(58) Field of Classification Search .................. 349/114, 349/129, 144
See application file for complete search history.

(56) References Cited

U.S. PATENT DOCUMENTS

| 4,345,249 A | 8/1982 | Togashi |
| 4,889,412 A | 12/1989 | Clerc et al. |
| 5,508,834 A | 4/1996 | Yamada et al. |
| 5,666,179 A | 9/1997 | Koma |
| 5,811,835 A | 9/1998 | Seiki et al. |
| 6,031,591 A | 2/2000 | Hamanaka |
| 6,069,740 A | 5/2000 | Hamanaka |
| 6,129,439 A | 10/2000 | Hou et al. |
| 6,195,140 B1 | 2/2001 | Kubo et al. |

(Continued)

FOREIGN PATENT DOCUMENTS
CN 1544985 A 11/2004

(Continued)

OTHER PUBLICATIONS

International Search Report for PCT/JP2006/315142 mailed Aug. 22, 2006.

(Continued)

*Primary Examiner* — Uyen-Chau N Le
*Assistant Examiner* — Chris H Chu
(74) *Attorney, Agent, or Firm* — Nixon & Vanderhye P.C.

(57) ABSTRACT

The viewing angle dependence of the γ characteristic in a CPA mode liquid crystal display device is reduced in a desired direction. The liquid crystal display device is usable for a use in which a viewing angle characteristic in direction D1 parallel to a display plane needs to be higher than a viewing angle characteristic in another direction D2 parallel to the display plane. An electrode of the liquid crystal display device includes a solid area formed of a conductive film and a non-solid area with no conductive film. The solid area of the electrode includes a plurality of unit solid areas, above each of which a liquid crystal domain exhibiting a radially inclined orientation state is formed.

18 Claims, 26 Drawing Sheets

U.S. PATENT DOCUMENTS

| | | |
|---|---|---|
| 6,208,395 B1 | 3/2001 | Kanoh et al. |
| 6,287,899 B1 | 9/2001 | Park et al. |
| 6,340,998 B1 | 1/2002 | Kim et al. |
| 6,384,889 B1 | 5/2002 | Miyachi et al. |
| 6,567,144 B1 | 5/2003 | Kim et al. |
| 6,661,488 B1 | 12/2003 | Takeda et al. |
| 6,710,825 B2 | 3/2004 | Kubo et al. |
| 6,717,642 B2 | 4/2004 | Sasaki et al. |
| 6,771,346 B2 | 8/2004 | Sugimoto et al. |
| 6,784,961 B2 | 8/2004 | Suzuki et al. |
| 6,788,375 B2 | 9/2004 | Ogishima et al. |
| 6,829,026 B2 | 12/2004 | Sasaki et al. |
| 6,839,107 B2 | 1/2005 | Kobashi |
| 6,839,108 B1 | 1/2005 | Hirakata et al. |
| 6,862,062 B2 | 3/2005 | Kubo et al. |
| 6,873,384 B2 | 3/2005 | Yamanaka et al. |
| 6,894,840 B2 | 5/2005 | Yamanaka et al. |
| 6,924,856 B2 | 8/2005 | Okumura et al. |
| 6,924,876 B2 | 8/2005 | Kubo et al. |
| 6,950,160 B2 | 9/2005 | Kubo et al. |
| 6,965,422 B2 | 11/2005 | Kubo et al. |
| 6,967,702 B2 | 11/2005 | Ishii et al. |
| 6,989,874 B2 | 1/2006 | Chae |
| 6,995,826 B2 | 2/2006 | Kubo et al. |
| 7,084,943 B2 | 8/2006 | Kubo et al. |
| 7,139,055 B2 | 11/2006 | Ogishima et al. |
| 7,145,624 B2 | 12/2006 | Kubo et al. |
| 7,202,923 B2 | 4/2007 | Yamabuchi et al. |
| 7,215,395 B2 | 5/2007 | Kubo et al. |
| 7,230,664 B2 | 6/2007 | Kubo et al. |
| 7,253,872 B2 | 8/2007 | Kume et al. |
| 7,277,146 B2 * | 10/2007 | Maeda ............................ 349/129 |
| 7,292,300 B2 | 11/2007 | Kubo et al. |
| 7,375,781 B2 | 5/2008 | Kubo |
| 7,379,137 B2 | 5/2008 | Kubo |
| 7,391,489 B2 | 6/2008 | Kume et al. |
| 7,525,614 B2 | 4/2009 | Jeong et al. |
| 7,554,631 B2 | 6/2009 | Tashiro et al. |
| 7,583,332 B2 | 9/2009 | Lee |
| 2001/0033353 A1 | 10/2001 | Shimoshikiryo |
| 2002/0022364 A1 | 2/2002 | Hatta et al. |
| 2002/0036740 A1 | 3/2002 | Kubo et al. |
| 2002/0054269 A1 | 5/2002 | Maeda et al. |
| 2002/0075436 A1 | 6/2002 | Kubo et al. |
| 2002/0080320 A1 | 6/2002 | Suzuki et al. |
| 2002/0149728 A1 | 10/2002 | Ogishima et al. |
| 2002/0191128 A1 | 12/2002 | Okumura et al. |
| 2003/0089949 A1 | 5/2003 | Lin et al. |
| 2003/0112213 A1 | 6/2003 | Noguchi et al. |
| 2003/0186478 A1 | 10/2003 | Morita et al. |
| 2003/0202144 A1 | 10/2003 | Kim et al. |
| 2003/0227429 A1 | 12/2003 | Shimoshikiryo |
| 2003/0231267 A1 | 12/2003 | Murai et al. |
| 2004/0027702 A1 | 2/2004 | Matsushita et al. |
| 2004/0070714 A1 | 4/2004 | Ishii et al. |
| 2004/0135949 A1 | 7/2004 | Maeda |
| 2004/0225312 A1 | 11/2004 | Orloff et al. |
| 2005/0030458 A1 | 2/2005 | Sasabayashi et al. |
| 2005/0041186 A1 | 2/2005 | Shimoshikiryo |
| 2005/0056127 A1 | 3/2005 | Yamabuchi et al. |
| 2005/0078251 A1 | 4/2005 | Chen et al. |
| 2005/0122452 A1 | 6/2005 | Yoshida et al. |
| 2005/0140876 A1 | 6/2005 | Kubo |
| 2005/0168674 A1 | 8/2005 | Kubo |
| 2005/0190322 A1 | 9/2005 | Okabe et al. |
| 2005/0205870 A1 | 9/2005 | Yamazaki |
| 2005/0213008 A1 * | 9/2005 | Kubo et al. ..................... 349/134 |
| 2005/0237463 A1 | 10/2005 | Kubo |
| 2005/0270447 A1 | 12/2005 | Tasaka et al. |
| 2005/0270462 A1 | 12/2005 | Koma |
| 2006/0055852 A1 | 3/2006 | Yoshida et al. |
| 2006/0119776 A1 | 6/2006 | Kubo et al. |
| 2006/0139758 A1 | 6/2006 | Segawa et al. |
| 2006/0158574 A1 | 7/2006 | Kubo et al. |
| 2006/0278874 A1 | 12/2006 | Kubo et al. |
| 2006/0291065 A1 | 12/2006 | Hasei et al. |
| 2007/0019132 A1 | 1/2007 | Kim et al. |
| 2007/0097293 A1 | 5/2007 | Nakanishi et al. |
| 2007/0139594 A1 | 6/2007 | Kubo et al. |
| 2007/0146591 A1 | 6/2007 | Kimura et al. |
| 2007/0199504 A1 | 8/2007 | Nakamura et al. |
| 2007/0216827 A1 | 9/2007 | Okada et al. |
| 2008/0002079 A1 | 1/2008 | Kimura |
| 2008/0266499 A1 | 10/2008 | Kubo |
| 2009/0185119 A1 | 7/2009 | Kikuchi et al. |
| 2009/0195740 A1 | 8/2009 | Imai et al. |
| 2009/0195741 A1 | 8/2009 | Hara et al. |
| 2009/0284683 A1 | 11/2009 | Usukura et al. |
| 2010/0007815 A1 | 1/2010 | Kosegawa et al. |
| 2010/0014031 A1 | 1/2010 | Kikuchi et al. |
| 2010/0020263 A1 | 1/2010 | Murao et al. |
| 2010/0039583 A1 | 2/2010 | Usukura |
| 2010/0045885 A1 | 2/2010 | Imai et al. |
| 2010/0045917 A1 | 2/2010 | Imai et al. |
| 2010/0053517 A1 | 3/2010 | Imai et al. |
| 2010/0060813 A1 | 3/2010 | Kawashima et al. |
| 2010/0110352 A1 | 5/2010 | Saitoh et al. |
| 2010/0118227 A1 | 5/2010 | Shibata et al. |
| 2010/0118238 A1 | 5/2010 | Shimada et al. |

FOREIGN PATENT DOCUMENTS

| | | |
|---|---|---|
| EP | 0 645 661 A1 | 3/1995 |
| EP | 1 701 202 A1 | 9/2006 |
| JP | 63-21907 B2 | 5/1988 |
| JP | 63-296004 | 12/1988 |
| JP | 02-149802 | 6/1990 |
| JP | 4-372934 | 12/1992 |
| JP | 05-188364 | 7/1993 |
| JP | 5-333328 | 12/1993 |
| JP | 06-034966 | 2/1994 |
| JP | 6-331831 | 12/1994 |
| JP | 07-027913 | 1/1995 |
| JP | 08-148254 | 6/1996 |
| JP | 8-190089 | 7/1996 |
| JP | 9-54318 A | 2/1997 |
| JP | 10-325953 | 12/1998 |
| JP | 11-095197 | 4/1999 |
| JP | 11-109390 | 4/1999 |
| JP | 11-237625 A | 8/1999 |
| JP | 11-242225 A | 9/1999 |
| JP | 11-295697 | 10/1999 |
| JP | 11-337961 | 12/1999 |
| JP | 2000-010124 | 1/2000 |
| JP | 2000-249807 | 9/2000 |
| JP | 2000-329906 | 11/2000 |
| JP | 2001-021862 A | 1/2001 |
| JP | 2001-201619 | 7/2001 |
| JP | 2001-337323 | 12/2001 |
| JP | 2002-236283 | 8/2002 |
| JP | 2003-035824 | 2/2003 |
| JP | 2003-43525 A | 2/2003 |
| JP | 2003-270636 | 9/2003 |
| JP | 2003-280548 | 10/2003 |
| JP | 2003-297850 A | 10/2003 |
| JP | 2003-315803 | 11/2003 |
| JP | 2003-337207 | 11/2003 |
| JP | 2004-258366 | 9/2004 |
| JP | 2004-264653 | 9/2004 |
| JP | 2004-325503 | 11/2004 |
| JP | 2005-128082 | 5/2005 |
| JP | 2005-157105 A | 6/2005 |
| JP | 2005-195733 | 7/2005 |
| JP | 2005-208553 | 8/2005 |
| JP | 2005-221639 | 8/2005 |
| JP | 2005-266370 | 9/2005 |
| JP | 2005-313638 | 11/2005 |
| JP | 2006-091229 | 4/2006 |
| JP | 2006-098525 A | 4/2006 |
| JP | 2006-184673 | 7/2006 |
| JP | 2006-220711 | 8/2006 |
| JP | 2006-220922 | 8/2006 |
| JP | 2006-293410 | 10/2006 |
| JP | 2007-101843 | 4/2007 |
| JP | 2007-133037 | 5/2007 |
| JP | 2007-329099 | 12/2007 |

| | | |
|---|---|---|
| JP | 2008-242307 A | 10/2008 |
| KR | 2003-058012 A | 7/2003 |
| KR | 2003-058140 A | 7/2003 |

OTHER PUBLICATIONS

English translation of the International Preliminary Report on Patentability mailed Feb. 14, 2008 in corresponding PCT Application No. PCT/JP2006/315142.

U.S. Appl. No. 12/666,461, filed Dec. 23, 2009, entitled "Liquid Crystal Display Device and Method of Manufacturing Liquid Crystal Display Device", not yet published.

U.S. Appl. No. 12/446,099, filed Apr. 17, 2009, entitled "Liquid Crystal Display Device and Method of Manufacturing Liquid Crystal Display Device", not yet published.

U.S. Appl. No. 12/446,071, filed Apr. 17, 2009, entitled "Liquid Crystal Display and Method of Manufacturing Liquid Crystal Display", not yet published.

U.S. Appl. No. 12/664,983, filed Dec. 16, 2009, entitled "Liquid Crystal Display Device", not yet published.

KR Notice of Reasons for Rejection and English translation thereof mailed Apr. 25, 2006 in Korean application No. 10-2004-0110955.

Kalantar, "Viewing Angle Control Using Optical Microstructures on Light-Guide Plate for Illumination System of Mobile Transmissive LCD Module", *IDW'02*, pp. 549-552.

Funamoto et al, "Prism-Sheetless High Bright Back0light System for Mobile Phone", *IDW'04*, pp. 687-690.

Suqita et al, "Brightness Enhancement in Transflective LCD by Concentration of Uniaxially Collimated Light with a Micro-Lenticular Lens", , IDW 2007, pp. 1515-1518.

Kubo et al., "Development of High-Performance ASV-LCDs Using Continuous Pinwheel Alignment (CPA) Mode", pp. 1-5, Jun. 7, 2001.

EP Supplementary Search Report mailed Dec. 17, 2009 in EP application 07791179.0.

EP Supplementary Search Report mailed Dec. 29, 2009 in EP application 07806137.1.

Office Action mailed Feb. 17, 2011 in related U.S. Appl. No. 12/442,218 (18pgs).

Office Action mailed Feb. 2, 2011 in related U.S. Appl. No. 12/440,791 (13 pgs).

\* cited by examiner (a)

(b)

(a)

(b)

(c)

(d)

(a)

(b)

(c)

(a)

30a (b)

30a (c)

30a (a)

(b)

(c)

(a) (b)

TRANSMITTED LIGHT INTENSITY IN THE FRONT DIRECTION

TRANSMITTED LIGHT INTENSITY IN THE FRONT DIRECTION

VIEWING DIRECTION (a)

(b)

(c)

(a)

(b)

(a)

(b)

(a)

(b)

… (US 7,995,887 B2)

LIQUID CRYSTAL DISPLAY DEVICE AND ELECTRONIC DEVICE USING THE SAME

This application is the U.S. national phase of International Application No. PCT/JP2006/315142 filed 31 Jul. 2006 which designated the U.S. and claims priority to JP 2005-225879 filed 3 Aug. 2005, the entire contents of each of which are hereby incorporated by reference.

TECHNICAL FIELD

The present invention relates to a liquid crystal display device, and specifically to a liquid crystal display device having a wide viewing angle and providing high quality display. The present invention also relates to an electronic device including such a liquid crystal display device.

BACKGROUND ART

Recently, thin and lightweight liquid crystal display devices have been used as display devices used for monitors of personal computers and display sections of mobile information terminals. Liquid crystal display devices of the TN (Twisted Nematic) or STN (Super Twisted Nematic) modes, which were conventionally common, have drawbacks of a narrow viewing angle. In order to improve the viewing angle, various display modes have been developed.

As a display mode having an improved viewing angle characteristic, the IPS (In-Plane Switching) mode described in Patent Document 1 or the MVA (Multi-domain Vertical Alignment) mode described in Patent Document 2 are known.

A display mode referred to as the CPA (Continuous Pinwheel Alignment) mode is also proposed (see, for example, Patent Document 3). In the CPA mode, one of a pair of electrodes facing each other with a liquid crystal layer of a vertical alignment type interposed therebetween has an opening or a cutout area. Liquid crystal molecules are oriented as being radially inclined, using an oblique electric field generated in an edge of the opening or the cutout area. Thus, high quality display with a wide viewing angle is provided.

Patent Document 1: Japanese Patent Publication for Opposition No. 63-21907
Patent Document 2: Japanese Laid-Open Patent Publication No. 11-242225
Patent Document 3: Japanese Laid-Open Patent Publication No. 2003-43525

DISCLOSURE OF THE INVENTION

Problems to be Solved by the Invention

As described above, the CPA mode realizes high quality display with a wide viewing angle. However, the following problem regarding the viewing angle characteristic has recently become conspicuous: the γ characteristic obtained when the display is observed in the front direction and the γ characteristic obtained when the display is observed obliquely are different; i.e., the γ characteristic depends on the viewing angle. The γ characteristic is the gradation dependence of the display luminance. Where the γ characteristic is different when the display is observed in the front direction from when the display is observed obliquely, the state of gray-scale display is different depending on the observation direction. This causes a problem for displaying an image such as a photo or for displaying TV broadcast or the like. The viewing angle dependence of the γ characteristic is visually recognized as, for example, a phenomenon that the display luminance obtained when observed obliquely is higher than the actual display luminance (referred to as "whitening").

The problem of the viewing angle dependence of the γ characteristic is more conspicuous in the CPA mode than in the IPS mode. However, with the IPS mode, it is more difficult to produce panels providing a high contrast when the display is observed in the front direction, with high productivity than with the CPA mode. Therefore, it is desired to alleviate the viewing angle dependence of the γ characteristic in a liquid crystal display device of the CPA mode.

Liquid crystal display devices are put into practice for various uses. Some of the uses require a higher viewing angle characteristic in a specific direction than in the other directions. For example, liquid crystal TVs are often observed at a increased viewing angle along the horizontal direction of the display plane, and therefore require a higher viewing angle characteristic in the horizontal direction than in the vertical direction.

The present invention made in light of the above-described problems has an object of reducing the viewing angle dependence of the γ characteristic for a desired direction in a CPA mode liquid crystal display device.

Means for Solving the Problems

A liquid crystal display device according to the present invention is a liquid crystal display device usable for a use in which a viewing angle characteristic in a first direction parallel to a display plane is required to be higher than a viewing angle characteristic in a second direction which is parallel to the display plane and is perpendicular to the first direction. The liquid crystal display device includes a first substrate; a second substrate; and a liquid crystal layer provided between the first substrate and the second substrate. A plurality of picture element regions are each defined by a first electrode provided on a surface of the first substrate, the surface being on the side of the liquid crystal layer, and a second electrode provided on the second substrate and facing the first electrode with the liquid crystal layer interposed therebetween; in each of the plurality of picture element regions, the first electrode includes a solid area formed of a conductive film and a non-solid area with no conductive film; and the liquid crystal layer forms a plurality of first liquid crystal domains, which exhibit a vertical orientation state when no voltage is applied between the first electrode and the second electrode, and each of which exhibits a radially inclined orientation state at least above the solid area of the first electrode by an oblique electric field generated in the vicinity of the solid area when a voltage is applied between the first electrode and the second electrode; the solid area of the first electrode includes a plurality of unit solid areas, above each of which each of the plurality of first liquid crystal domains is formed; and the plurality of unit solid areas each have a shape with which length $L_1$ in the first direction is greater than length $L_2$ in the second direction. Thus, the above objective is achieved.

In one preferred embodiment, the plurality of unit solid areas are each generally rectangular.

In one preferred embodiment, the plurality of unit solid areas are each generally rectangular with generally arcked corners.

In one preferred embodiment, in each of the plurality of unit solid areas, the ratio $L_1/L_2$ between length $L_1$ in the first direction and length $L_2$ in the second direction is 1.5 or greater.

In one preferred embodiment, in each of the plurality of unit solid areas, the ratio $L_1/L_2$ between length $L_1$ in the first direction and length $L_2$ in the second direction is 2.2 or less.

In one preferred embodiment, the liquid crystal layer forms at least one second liquid crystal domain which exhibits a radially inclined orientation state above the non-solid area by the oblique electric field when a voltage is applied between the first electrode and the second electrode.

In one preferred embodiment, the non-solid area of the first electrode includes at least one opening.

In one preferred embodiment, the non-solid area of the first electrode includes at least one cutout area.

In one preferred embodiment, in each of the plurality of picture element regions, the non-solid area of the first electrode has a surface area which is smaller than a surface area of the solid area of the first electrode.

In one preferred embodiment, the second substrate includes an orientation regulating structure in a region corresponding to at least one of the plurality of first liquid crystal domains, wherein the orientation regulating structure expresses an orientation regulating force for putting liquid crystal molecules in the at least one liquid crystal domain into a radially inclined orientation state at least in the presence of an applied voltage.

In one preferred embodiment, the orientation regulating structure is at least one first protrusion protruding from the second substrate into the liquid crystal layer.

In one preferred embodiment, the first substrate includes at least one second protrusion, which is at least partially located above the non-solid area; a cross-sectional shape of the second protrusion in an in-plane direction of the first substrate is conformed to a shape of a boundary between the solid area and the non-solid area; and a side surface of the second protrusion has an orientation regulating force acting on liquid crystal molecules in the liquid crystal layer in the same direction as an orientation regulating direction provided by the oblique electric field.

In one preferred embodiment, the picture element region has a transmission area for providing transmission mode display and a reflection area for providing reflection mode display.

In one preferred embodiment, the first electrode includes a transparent electrode for defining the transmission area and a reflective electrode for defining the reflection area.

In one preferred embodiment, the liquid crystal display device according to the present invention includes a pair of polarization plates located to face each other with the liquid crystal layer interposed between, wherein transmission axes of the pair of polarization plates are generally perpendicular to each other, and one of the transmission axes is generally parallel to the first direction.

An electronic device according to the present invention includes the liquid crystal display device having the above-described structure. Thus, the above objective is achieved.

In one preferred embodiment, the electronic device according to the present invention further includes a circuit for receiving television broadcast. The plurality of unit solid areas are each located such that a longitudinal direction thereof is generally parallel to a horizontal direction of the display plane.

EFFECTS OF THE INVENTION

In a liquid crystal display device according to the present invention, each of the unit solid areas of the electrode is generally rectangular, and the longitudinal direction thereof is generally parallel to a specific direction for which a high viewing angle characteristic is required. Therefore, the viewing angle dependence of the γ characteristic when the viewing angle is decreased along the specific direction can be reduced, and a high viewing angle characteristic can be realized for that specific direction.

Figure 1:
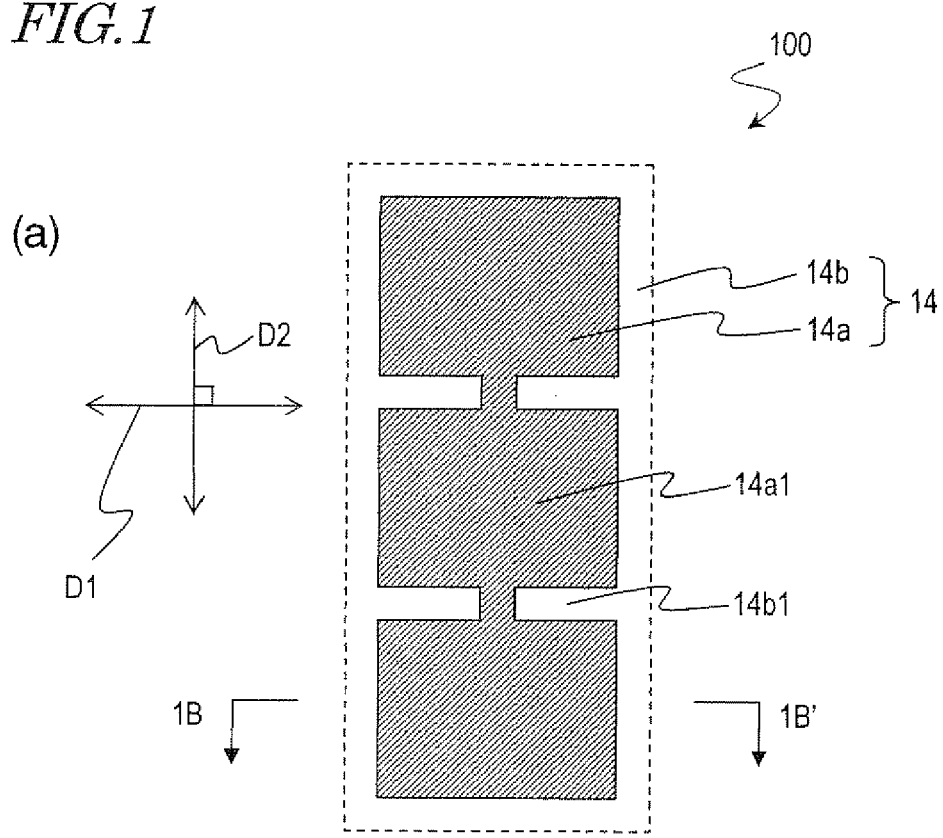
FIG. 1 schematically shows a structure of one picture element region of a liquid crystal display device 100 according to the present invention; (a) is a plan view, and (b) is a cross-sectional view taken along line 1B-1B' in (a).
Figure 1:
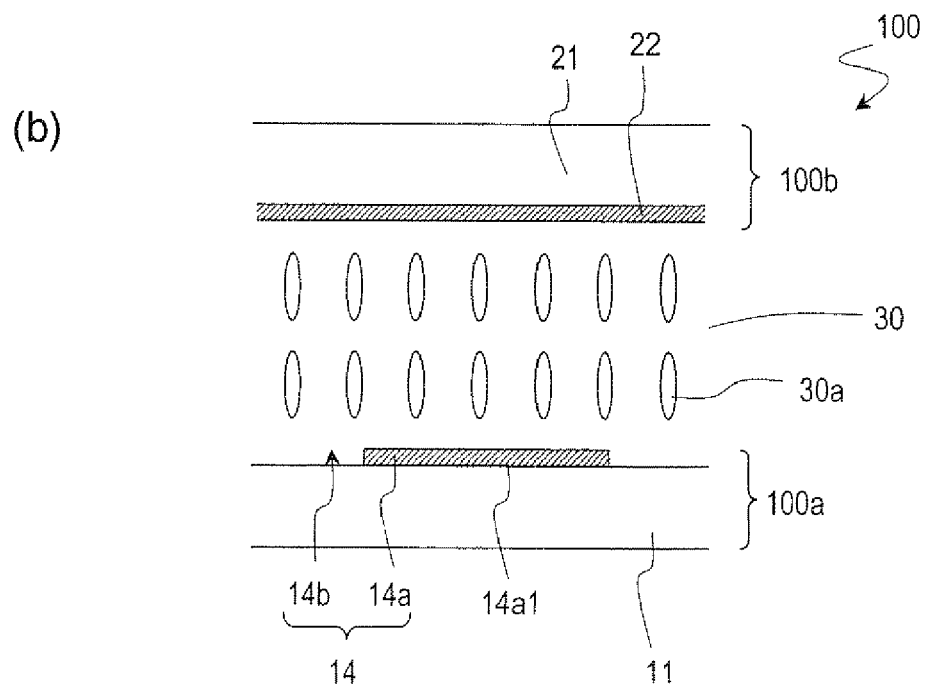

DESCRIPTION OF THE REFERENCE NUMERALS 11, 21 Transparent substrate
14 Picture element electrode
14a Solid area
14a1 Unit solid area
14b Non-solid area
14b1 Cutout area
14b2 Opening
22 Counter electrode
23 Protrusion (orientation regulating structure)
29 Transparent dielectric layer
30 Liquid crystal layer
30a Liquid crystal molecule
60 Protrusion
60t Top surface of the protrusion
60s Side surface of the protrusion
100, 200, 300, 400 Liquid crystal display device
100a, 300a, 400a TFT substrate
100b, 200b, 400b Counter substrate

BEST MODE FOR CARRYING OUT THE INVENTION

Hereinafter, embodiments of the present invention will be described with reference to the drawings. A liquid crystal display device according to the present invention has superb display characteristics and so is preferably usable for an active matrix liquid crystal display device. The following embodiments of the present invention will be described regarding an active matrix liquid crystal display device using thin film transistors (TFTs), but the present invention is not limited thereto and is also applicable to an active matrix liquid crystal display device using MIM or a passive matrix liquid crystal display device.

In this specification, a region of a liquid crystal display device corresponding to a "picture element", which is the minimum unit of display, will be referred to as a "picture element region". In a color liquid crystal display device, a plurality of "picture elements" including R, G and B "picture elements" correspond to one "pixel".

In an active matrix liquid crystal display device, a picture element region is defined by a picture element electrode and an area of a counter electrode opposing the picture element electrode. In a passive matrix liquid crystal display device, a picture element region is defined by each of areas in which column electrodes provided in stripes and row electrodes provided to be perpendicular to the column electrodes cross each other. In an arrangement with a black matrix, strictly speaking, a picture element region is a portion, which opposes an opening of the black matrix, in a region across which a voltage is applied in accordance with the intended display state.

Embodiment 1

With reference to FIGS. 1(a) and 1(b), a structure of one of picture element regions of a liquid crystal display device 100 in an embodiment according to the present invention will be described. FIG. 1(a) is a plan view of the picture element region as seen in the direction of the normal to the substrate, and FIG. 1(b) is a cross-sectional view taken along line 1B-1B' in FIG. 1(a). FIG. 1(b) shows a state in which no voltage is applied across the liquid crystal layer.

The liquid crystal display device 100 includes an active matrix substrate (hereinafter, referred to as the "TFT substrate") 100a, a counter substrate (hereinafter, referred to also as the "color filter substrate") 100b, and a liquid crystal layer 30 provided between the TFT substrate 100a and the counter substrate 100b.

Liquid crystal molecules 30a in a liquid crystal layer 30 have a negative dielectric anisotropy. As shown in FIG. 1(b), when no voltage is applied across the liquid crystal layer 30, the liquid crystal molecules 30a are oriented vertical to a surface of, and by virtue of, a vertical alignment film (not shown) as a vertical alignment layer provided on a surface of each of the TFT substrate 100a and the counter substrate 100b, the surface being on the side of the liquid crystal layer 30. In this state, the liquid crystal layer 30 is expressed as being in a "vertical orientation state". The liquid crystal molecules 30a in the liquid crystal layer 30 in the vertical orientation state may occasionally be slightly inclined with respect to the normal to the surface of each vertical alignment film (the surface of each substrate) depending on the type of vertical alignment film or the type of liquid crystal material. Generally, a state where the axis of liquid crystal molecules (referred to also as an "axial direction") is oriented at an angle of about 85 degrees or greater with respect to the surface of the vertical alignment film is referred to as the "vertical orientation state".

The TFT substrate 100a of the liquid crystal display device 100 includes a transparent substrate (for example, a glass substrate) 11 and a picture element electrode 14 provided on a surface thereof. The counter substrate 100b includes a transparent substrate (for example, a glass substrate) 21 and a counter electrode 22 provided on a surface thereof. The orientation state in the liquid crystal layer 30 in each picture element region changes in accordance with the voltage applied between the picture element electrode 14 and the counter electrode 22, which are arranged to face each other with the liquid crystal layer 30 interposed therebetween. An image is displayed by utilizing the phenomenon that the modulation state of light transmitting through the liquid crystal layer 30 changes along with a change in the orientaion state in the liquid crystal layer 30.

In order to display images in a normally black mode, a pair of polarization plates facing each other with the liquid crystal layer 30 interposed therebetween are located such that the transmission axes thereof are substantially perpendicular to each other (crossed-Nicols state). When the transmission axes of the pair of polarization plates located in the crossed-Nicols state are observed in an oblique direction, the polarization plates are shifted from the state of being perpendicular to each other (the angle made by the transmission axes exceeds 90 degrees). Therefore, light leaks. For this reason, in a display device such as a TV which is often observed at angles changing along the horizontal direction of the display plane, the pair of polarization plates are preferably located such that the transmission axis of one of the plates is horizontal with respect to the display plane. With such an arrangement, the transmission axes are prevented from being shifted from the state of being perpendicular to each other when the viewing angle is decreased along the horizontal direction. Hence, light leaks can be suppressed against the change in the viewing angle along the horizontal direction, and the viewing angle dependence of the display quality can be suppressed.

Now, a basic structure and function of the picture element electrode 14 of the liquid crystal display device 100 according to the present invention will be described.

The picture element electrode 14 includes an area 14a formed of a conductive film (e.g., an ITO film) and an area 14b with no conductive film (deprived of the conductive film). The area 14a formed of the conductive film will be referred to as a "solid area", and the area 14b with no conductive film will be referred to as a "non-solid area".

The solid area 14a includes a plurality of areas each substantially surrounded by the non-solid area 14b (each of such areas will be referred to as a "unit solid area 14a1"). The unit solid areas 14a1 have substantially the same shape and substantially the same size as one another. Specifically, each solid area 14a1 has a rectangular shape. Typically, the plurality of unit solid areas 14a1 are electrically connected to each other in each picture element region.

The non-solid area 14b includes a plurality of cutout areas 14b1 formed to cut out a part of the solid area 14a. The non-solid area 14b including the cutout areas 14ab1 is formed by patterning the conductive film used to form the picture element electrode 14.

When a voltage is applied between the picture element electrode 14 having the above-described structure and the counter electrode 22, a plurality of liquid crystal domains each exhibiting a radially inclined orientation are formed by an oblique electric field generated near the unit solid area 14a1 (in the vicinity of the outer periphery thereof), namely, in an edge of the non-solid area 14b. One liquid crystal domain is formed above each unit solid area 14a1.

The mechanism by which liquid crystal domains are formed by an oblique electric field described above will be described with reference to FIGS. 2(a) and (b). FIGS. 2(a) and (b) each show a state where a voltage is applied across the liquid crystal layer 30. FIG. 2(a) schematically shows a state where the orientation of the liquid crystal molecules 30a has just started to change (initial ON state) in accordance with the voltage applied across the liquid crystal layer 30. FIG. 2(b) schematically shows a state where the orientation of the liquid crystal molecules 30a, which has been changing in accordance with the applied voltage, has reached a steady state. In FIGS. 2(a) and 2(b), curves EQ represent equipotential lines.

Where the picture element electrode 14 and the counter electrode 22 are at the same potential (where no voltage is applied across the liquid crystal layer 30), the liquid crystal molecules 30a in the picture element region are oriented vertical to a surface of each of the substrates 11 and 21 as shown in FIG. 1(b).

When a voltage is applied across the liquid crystal layer 30, a potential gradient represented by the equipotential lines EQ shown in FIG. 2(a) (perpendicular to the electric line force) is generated. In a region of the liquid crystal layer 30 which is between the solid area 14a of the picture element electrode 14 and the counter electrode 22, the equipotential lines EQ are parallel to the surfaces of the solid area 14a and the counter electrode 22. The equipotential lines EQ drop in a region corresponding to the non-solid area 14b of the picture element region. As a result, an oblique electric field represented by an inclined portion of the equipotential lines EQ is generated in a region of the liquid crystal layer 30 above each edge of the non-solid area 14b (a peripheral portion within the non-solid area 14b including the boundary between the non-solid area 14b and the solid area 14a).

Upon the liquid crystal molecules 30a having a negative dielectric anisotropy, a torque acts to direct the axial direction of such liquid crystal molecules 30a to be parallel to the equipotential lines EQ (vertical to the electric force line). Accordingly, the liquid crystal molecules 30a above a left (in the figure) edge EG incline (rotate) clockwise, and the liquid crystal molecules 30a above a right (in the figure) edge EG incline (rotate) counterclockwise. As a result, the liquid crystal molecules 30a above the edges are oriented parallel to the corresponding portions of the equipotential lines EQ.

Now, with reference to FIGS. 3(a) through (d), a change in the orientation of the liquid crystal molecules 30a will be described in detail.

When an electric field is generated in the liquid crystal layer 30, a torque acts upon the liquid crystal molecules 30a having a negative dielectric anisotropy so as to direct the axial direction thereof to be parallel to an equipotential line EQ. As shown in FIG. 3(a), when an electric field represented by an equipotential line EQ perpendicular to the axial direction of the liquid crystal molecule 30a is generated, a torque urging the liquid crystal molecule 30a to incline clockwise and a torque urging the liquid crystal molecule 30a to incline counterclockwise act on the liquid crystal molecule 30a with the same probability. Therefore, in a region of the liquid crystal layer 30 between the pair of parallel plate-shaped electrodes facing each other, liquid crystal molecules 30a that are subjected to a clockwise torque and liquid crystal molecules 30a that are subjected to a counterclockwise torque are both present. As a result, the transition to the intended orientation state in accordance with the voltage applied across the liquid crystal layer 30 may not proceed smoothly.

It is now assumed that, as shown in FIG. 2(a), an electric field represented by a portion of the equipotential lines EQ inclined with respect to the axial direction of the liquid crystal molecules 30a (oblique electric field) is generated above the edge EG of the non-solid area 14b. Then, as shown in FIG. 3(b), the liquid crystal molecule 30a inclines in whichever direction in which the liquid crystal molecule 30a needs to be inclined by a smaller degree to be parallel to the equipotential line EQ (in the shown example, in the counterclockwise direction).

As shown in FIG. 3(c), in a region where an electric field represented by an equipotential line EQ perpendicular to the axial direction of the liquid crystal molecule 30a is generated, the liquid crystal molecule 30a is inclined in the same direction as the liquid crystal molecules 30a located on the inclined portion of the equipotential lines EQ, so that the orientation of the former liquid crystal molecules 30a is continuous (in conformity) to the orientation of the latter liquid crystal molecules 30a.

When, as shown in FIG. 3(d), an electric field represented by an equipotential line EQ having a continuous concave/convex pattern is generated, the liquid crystal molecules 30a located on a flat portion of the equipotential line EQ are oriented so as to conform to the orientation direction defined by the liquid crystal molecules 30a located on adjacent inclined portions of the equipotential line EQ. The phrase "located on an equipotential line EQ" as used herein means "located within an electric field represented by the equipotential line EQ".

As described above, the change in the orientation of the liquid crystal molecules 30a starts with those located on the inclined portion of the equipotential line EQ and proceeds to reach a steady state, which is schematically shown in FIG. 2(b). The liquid crystal molecules 30a located at, of in the vicinity of, the center of the unit solid area 14a1 are influenced substantially equally by the orientation of the liquid crystal molecules 30a above the edges EG on both sides, and therefore are kept oriented perpendicular to the equipotential lines EQ. By contrast, the liquid crystal molecules 30a away from the center of the unit solid area 14a1 incline by the influence of the orientation of the liquid crystal molecules 30a at a closer edge EG. As a result, an inclined orientation state which is symmetric with respect to the center of the unit solid area 14a1 is formed.

This orientation is, as viewed in a direction perpendicular to the display plane of the liquid crystal display device 100 (direction perpendicular to the surfaces of the substrates 11 and 21), in a state where the axial directions of the liquid crystal molecules 30a are radial around the center of the unit solid area 14a1 (not shown). Herein, such an orientation state will be referred to as a "radially inclined orientation". A region of the liquid crystal layer 30 which exhibits a radially inclined orientation around one central point will be referred to as a "liquid crystal domain".

The radially inclined orientation in a liquid crystal domain formed above the unit solid area 14a1, and the orientation in the liquid crystal layer 30 above the non-solid area 14b, are continuous with each other, and are both in conformity to the orientation of the liquid crystal molecules 30a above the edge EG of the non-solid area 14b. Therefore, no disclination line (orientation defect) is formed along the boundary therebetween, and the display quality, which would be declined due to the generation of the disclination line, is not declined.

As described above, the picture element electrode 14 of the liquid crystal display device 100 according to the present invention includes a non-solid area 14b with no conductive film, and an electric field represented by the equipotential lines EQ having an inclined portion is formed in the liquid crystal layer 30 in the picture element region. The liquid crystal molecules 30a in the liquid crystal layer 30, which have a negative dielectric anisotropy and are in a vertical orientation state when no voltage is applied, are changed in the orientation direction, using a change in the orientation direction of the liquid crystal molecules 30a located above the inclined portion of the equipotential lines EQ as a trigger. Therefore, a liquid crystal domain having a stable radially inclined orientation is formed above the unit solid area 14a1. The orientation of the liquid crystal molecules in the liquid crystal domain is changed in accordance with the voltage applied across the liquid crystal layer. Thus, an image is displayed.

Figure 4:
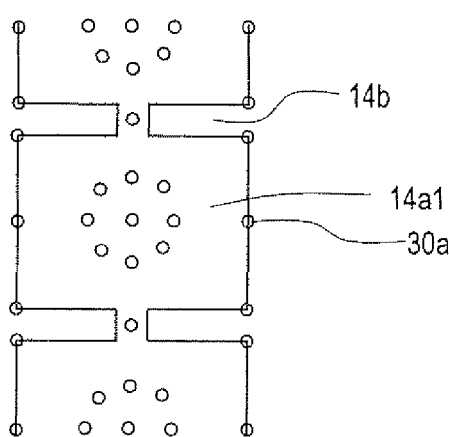
FIGS. 4(a) through (c) schematically show the orientation state of the liquid crystal molecules as seen in the direction of the normal to the substrate.
Figure 4:
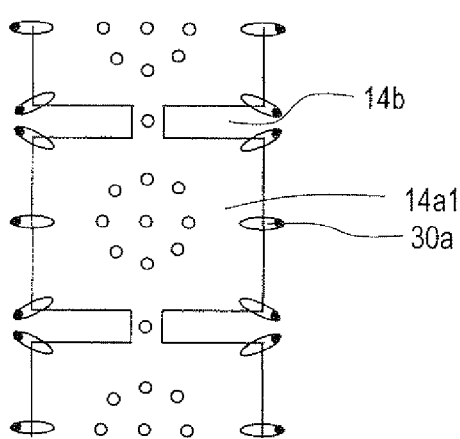
Figure 4:
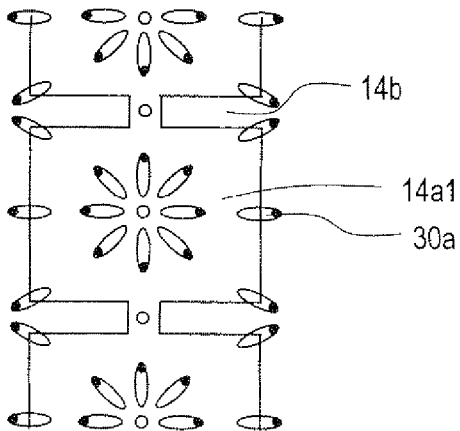

FIGS. 4(a) through (c) show a change in the orientation state of the liquid crystal molecules 30a as viewed in the direction of the normal to the substrate. In FIGS. 4(b) and (c) which show an orientation state of the liquid crystal molecules 30a as viewed in the direction of the normal to the substrate, tips of the elliptical liquid crystal molecules 30a are shown black. Such a black tip indicates that the liquid crystal molecule 30*a* is inclined such that the black tip is closer to the substrate including the picture element electrode 14 than the other tip. This is also applicable to the figures referred to later in this specification.

Where the picture element electrode 14 and the counter electrode 22 are at the same potential, namely, where no voltage is applied across the liquid crystal layer 30, the liquid crystal molecules 30*a*, regulated in the orientation direction by the vertical alignment film (not shown) provided on the surface of each of the TFT substrate 100*a* and the counter substrate 100*b* which is on the side of the liquid crystal layer 30, are in a vertical orientation state as shown in FIG. 4(*a*).

Figure 2:
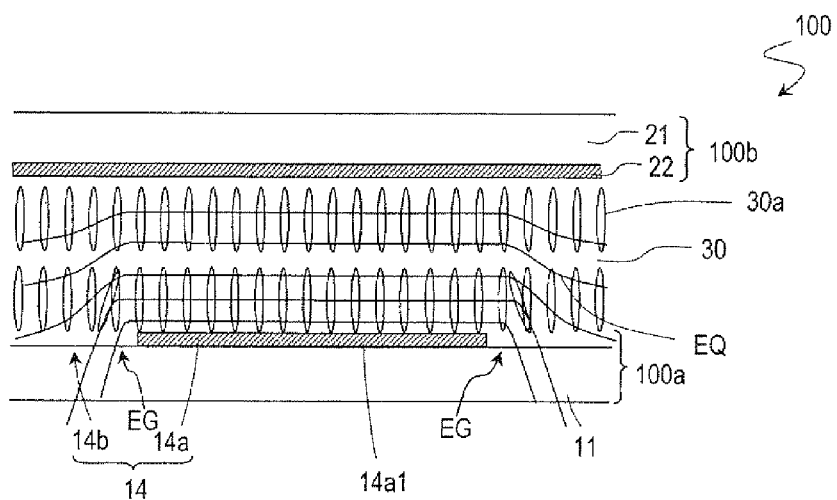
FIGS. 2(a) and (b) show a state where a voltage is applied to a liquid crystal layer 30 of the liquid crystal display device 100; (a) schematically shows a state where the orientation has just started to change (initial ON state), and (b) schematically shows a steady state.
Figure 2:
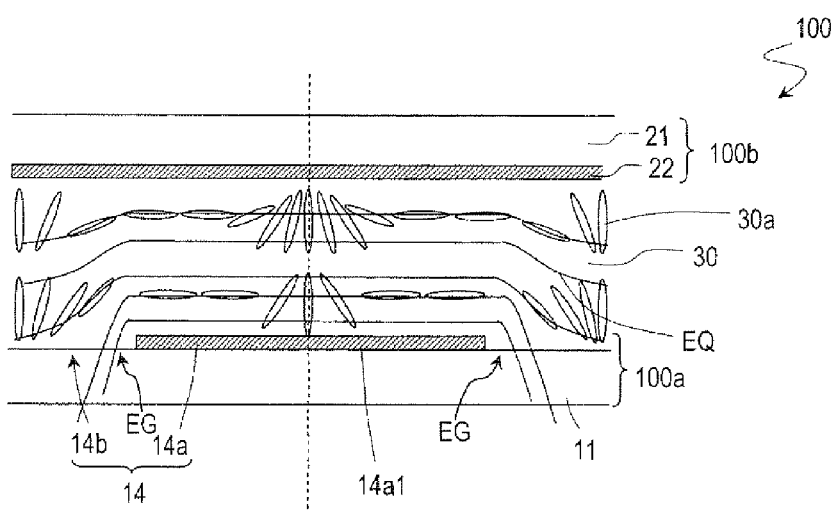
Figure 3:
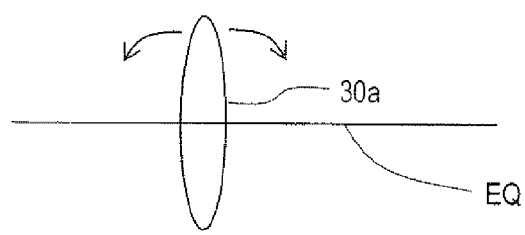
FIGS. 3(a) through (d) schematically show the relationship between the electric force line and the orientation of liquid crystal molecules.
Figure 3:
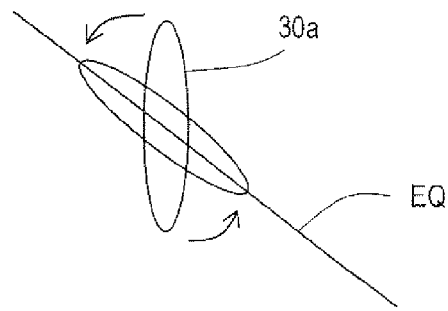
Figure 3:
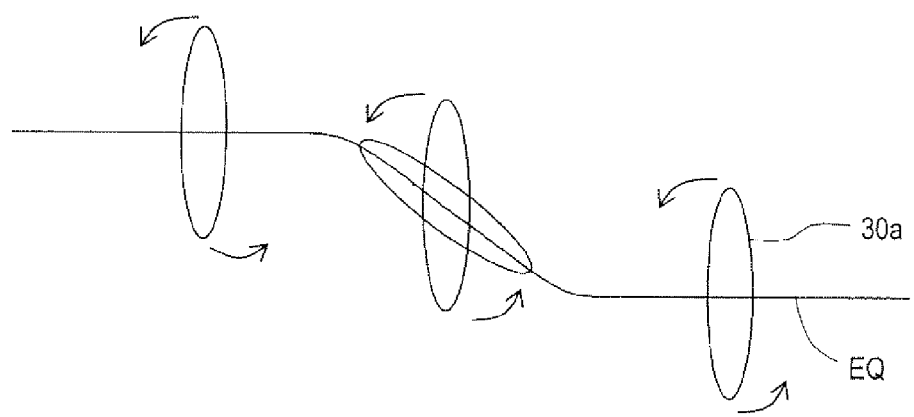
Figure 3:
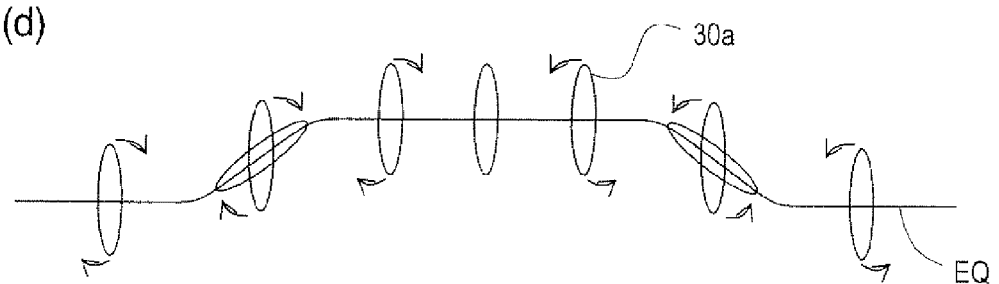

When a voltage is applied across the liquid crystal layer 30 and an electric field represented by the equipotential lines EQ shown in FIG. 2(*a*) is generated, a torque acts on the liquid crystal molecules 30*a* having a negative dielectric anisotropy so as to direct the axial direction to be parallel to the equipotential lines Q. As described above with reference to FIGS. 3(*a*) and (*b*), the direction of inclination (rotation) of the liquid crystal molecules 30*a* in the electric field represented by the equipotential lines EQ which are perpendicular to the molecular axis of the liquid crystal molecules 30*a* is not uniquely defined (FIG. 3(*a*)). Therefore, the orientation of such liquid crystal molecules 30*a* is not easily changed (not easily inclined or rotated). By contrast, the direction of inclination (rotation) of the liquid crystal molecules 30*a* under the equipotential lines EQ inclined with respect to the molecular axis of the liquid crystal molecules 30*a* is uniquely defined. Therefore, the orientation of such liquid crystal molecules 30*a* is easily changed. As shown in FIG. 4(*b*), the liquid crystal molecules 30*a* start inclining from those above the edges of the non-solid area 14*b* in which the molecular axis of the liquid crystal molecules 30*a* is inclined with respect to the equipotential lines EQ. Then, as described above with reference to FIG. 3(*c*), the surrounding liquid crystal molecules 30*a* also incline so as to be conformed to the orientation of the liquid crystal molecules 30*a* above the edges of the non-solid area 14*b*. As a result, the axial direction of the liquid crystal molecules 30*a* is stabilized in the state shown in FIG. 4(*c*) (radially inclined orientation).

In this way, when a voltage is applied, the liquid crystal molecules 30*a* in the picture element region incline from those above the edge of the non-solid area 14*b* (the outer periphery of the unit solid area 14*a*1) toward the center of the unit solid area 14*a*1. Therefore, the liquid crystal molecules 30*a* at, or in the vicinity of, the center of the unit solid area 14*a*1, where the orientation regulating forces on the liquid crystal molecules 30*a* from the edges are balanced, are kept oriented perpendicular to the surface of the substrates. The surrounding liquid crystal molecules 30*a* are continuously inclined radially around the liquid crystal molecules 30*a* at, or in the vicinity of, the center of the unit solid area 14*a*1.

Figure 5:
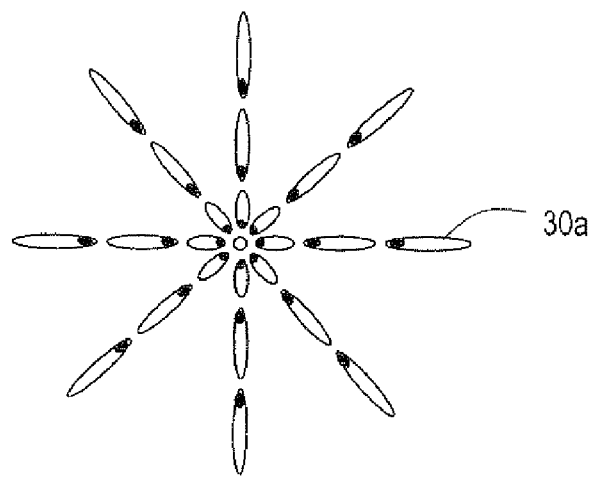
FIGS. 5(a) through (c) schematically show examples of radially inclined orientation of the liquid crystal molecules.
Figure 5:
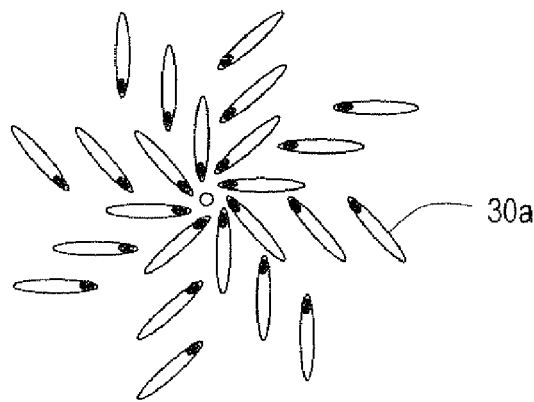
Figure 5:
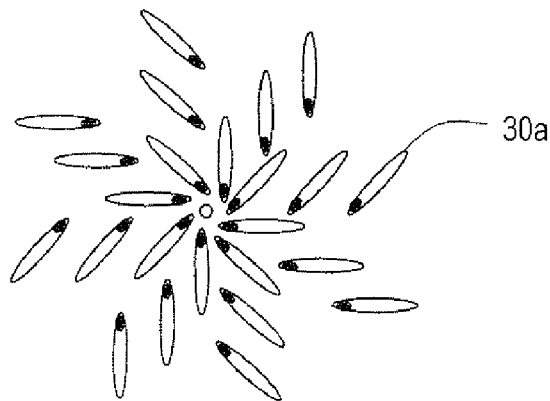

Regarding the radially inclined orientation of the liquid crystal molecules 30*a*, a radially inclined orientation having a counterclockwise or clockwise spiral pattern as shown in FIG. 5(*b*) or (*c*) is more stable than the simple radially inclined orientation as shown in FIG. 5(*a*). The spiral orientation is different from a normal twist orientation in which the orientation direction of the liquid crystal molecules 30*a* spirally changes along the thickness of the liquid crystal layer 30. In the spiral orientation, the orientation direction of the liquid crystal molecules 30*a* does not substantially change along the thickness of the liquid crystal layer 30 when seen in a minute region. In other words, the orientation in a cross section at any thickness position of the liquid crystal layer 30 (in a plane parallel to the layer plane) is as shown in FIG. 5(*b*) or (*c*), with substantially no twist deformation along the thickness of the liquid crystal layer 30. In a liquid crystal domain as a whole, however, there is a certain degree of twist deformation.

Where a material obtained by adding a chiral agent to a nematic liquid crystal material having a negative dielectric anisotropy is used, the liquid crystal molecules 30*a* exhibit a radially inclined orientation of a counterclockwise or clockwise spiral pattern shown in FIG. 5(*b*) or (*c*) around the unit solid area 14*a*1 when a voltage is applied. Whether the spiral pattern is counterclockwise or clockwise is determined by the type of chiral agent used. Thus, by controlling the liquid crystal layer 30 above the unit solid area 14*a*1 into a radially inclined orientation of a spiral pattern in the presence of an applied voltage, the direction of the spiral pattern of the radially-inclined liquid crystal molecules 30*a*, which surround liquid crystal molecules 30*a* standing vertical to the substrate plane, can be made uniform in all the liquid crystal domains. Therefore, uniform display with no coarseness is realized. Since the direction of the spiral pattern around the liquid crystal molecules 30*a* standing vertical to the substrate plane is definite, the response speed upon application of a voltage across the liquid crystal layer 30 is also improved.

Where a larger amount of chiral agent is added, the orientation of the liquid crystal molecules 30*a* changes in a spiral pattern along the thickness of the liquid crystal layer 30 as in the normal twisted orientation. In an orientation state of the liquid crystal molecules 30*a* which does not change in a spiral pattern along the thickness of the liquid crystal layer 30, the liquid crystal molecules 30*a* which are oriented perpendicular or parallel to the polarization axis of the polarization plate do not give a phase difference to the incident light. Therefore, incident light passing through a region of such an orientation state does not contribute to the transmittance. In contrast, in an orientation state of the liquid crystal molecules 30*a* which changes in a spiral pattern along the thickness of the liquid crystal layer 30, the liquid crystal molecules 30*a* which are oriented perpendicular or parallel to the polarization axis of the polarization plate also give a phase difference to the incident light, and the optical rotatory power can also be utilized. Therefore, incident light passing through a region of such an orientation state also contributes to the transmittance. Thus, an liquid crystal display device capable of providing bright display is realized.

Figure 6:
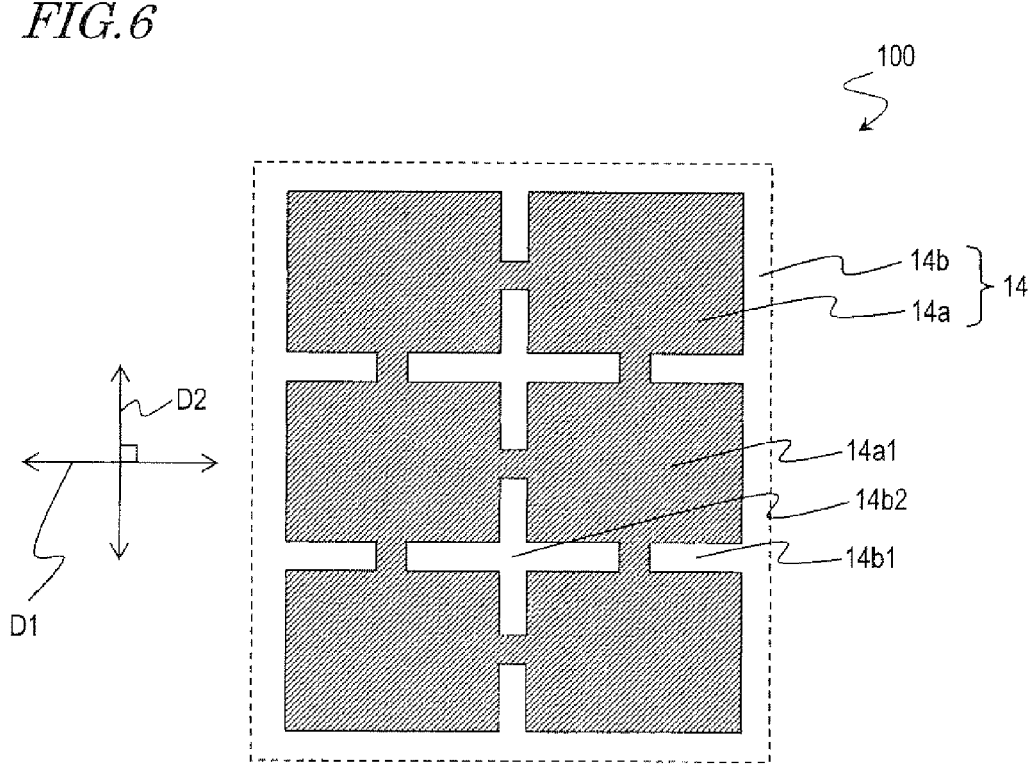
FIG. 6 is a plan view schematically showing another picture element electrode usable for the liquid crystal display device according to the present invention.

FIG. 1 shows a structure in which the unit solid areas 14*a*1 are arranged in one line in the picture element region. The unit solid areas 14*a*1 may be arranged in a plurality of lines in a picture element region. FIG. 6 shows another example of the picture element electrode usable for the liquid crystal display device 100.

Figure 7:
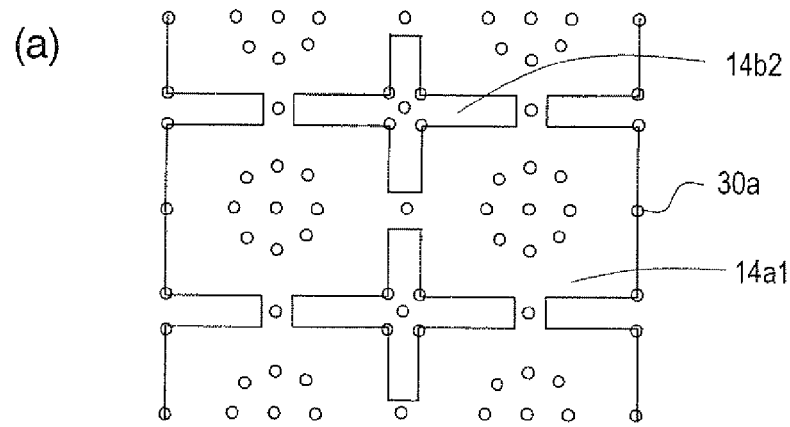
FIGS. 7(a) through (c) schematically show the orientation state of the liquid crystal molecules including the another picture element electrode as seen in the direction of the normal to the substrate.
Figure 7:
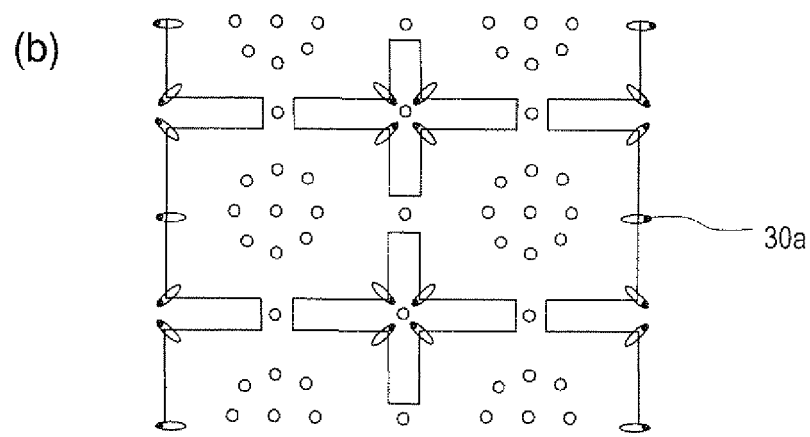
Figure 7:
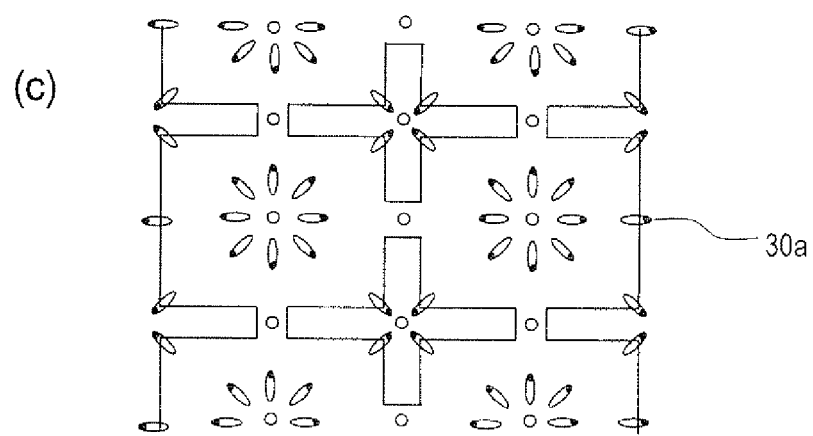

The solid area 14*a* of the picture element electrode 14 shown in FIG. 6 includes a plurality of unit solid areas 14*a*1 arranged in three rows and two columns. The non-solid area 14*b* includes a plurality of openings 14*b*2 surrounded by the solid area 14*a*. When a voltage is applied, liquid crystal domains are formed in regions corresponding to the unit solid areas 14*a*1 and also in regions corresponding to the openings 14*b*2. This is shown in FIGS. 7(*a*) through (*c*). FIG. 7(*a*) shows a state with no voltage, FIG. 7(*b*) shows a state where the orientation starts changing, and FIG. 7(*c*) shows a steady state.

As shown in FIG. 7(*a*), when no voltage is applied, the liquid crystal molecules 30*a* are oriented substantially vertical to the substrate plane. When a voltage is applied across the liquid crystal layer 30, as shown in FIG. 7(*b*), the liquid crystal molecules 30*a* in the vicinity of the edges of the non-solid area 14*b* start inclining by the influence of the oblique electric field. The liquid crystal molecules 30*a* in other regions also incline so as to be conformed to the orientation of the inclined liquid crystal molecules 30a in the vicinity of the edges of the non-solid area 14b. As a result, as shown in FIG. 7(c), liquid crystal domains are formed above the unit solid areas 14a1 and above the openings 14b2. The liquid crystal molecules 30a in the liquid crystal domain formed in the region corresponding to each opening 14b2 are in a radially inclined orientation symmetrical with respect to the center of the opening 14b2.

The radially inclined orientation in the liquid crystal domain formed above each unit solid area 14a1 and the radially inclined orientation in the liquid crystal domain formed above each opening 14b2 are continuous to each other, and both are conformed to the orientation of the liquid crystal molecules 30a above the edges EG of the non-solid area 14b. The liquid crystal molecules 30a in the liquid crystal domain formed above each opening 14b2 are oriented in a cone opened upward (toward the counter substrate), whereas the liquid crystal molecules 30a in the liquid crystal domain formed above each unit solid area 14a1 are oriented in a cone opened downward (toward the TFT substrate).

The orientation in the liquid crystal domain formed above each unit solid area 14a1 and the orientation in the liquid crystal domain formed above each opening 14b2 are continuous each other. Therefore, no disclination line (orientation defect) is formed along the boundary therebetween, and the display quality, which would be declined due to the generation of the disclination line, is not declined.

In order to realize a good response characteristic (quick response speed), an oblique electric field for controlling the orientation of the liquid crystal molecules 30a needs to act on many liquid crystal molecules 30a. For this purpose, many non-solid areas 14b need to be formed. The response characteristic can also be improved by forming many openings 14b2. The reduction in display quality (generation of coarseness), which would be caused by the formation of the openings 14b2, is suppressed because liquid crystal domains are formed in correspondence with the openings 14b2.

Now, a preferable structure for reducing the viewing angle dependence of the γ characteristic and thus suppressing whitening in a desirable direction will be described. The present inventor performed various studies on the relationship between the shape of the electrode and the viewing angle dependence of the γ characteristic in the CPA mode. As a result, the present inventor found that where the direction in which whitening needs to be specifically suppressed and the shape of the unit solid area 14a1 fulfill a certain relationship, whitening in that direction can be suppressed.

As shown in FIG. 1(a), the unit solid area 14a1 in this embodiment is rectangular and located such that the longitudinal direction thereof is generally parallel to direction D1 for which a high viewing angle characteristic is required. By such an arrangement of the rectangular unit solid area 14a1, the viewing angle dependence of the γ characteristic in direction D1 can be reduced and thus whitening can be suppressed. Hereinafter, the viewing angle characteristic of the liquid crystal display device 100 in this embodiment will be described with a comparison with a liquid crystal display device as a comparative example.

Figure 8:
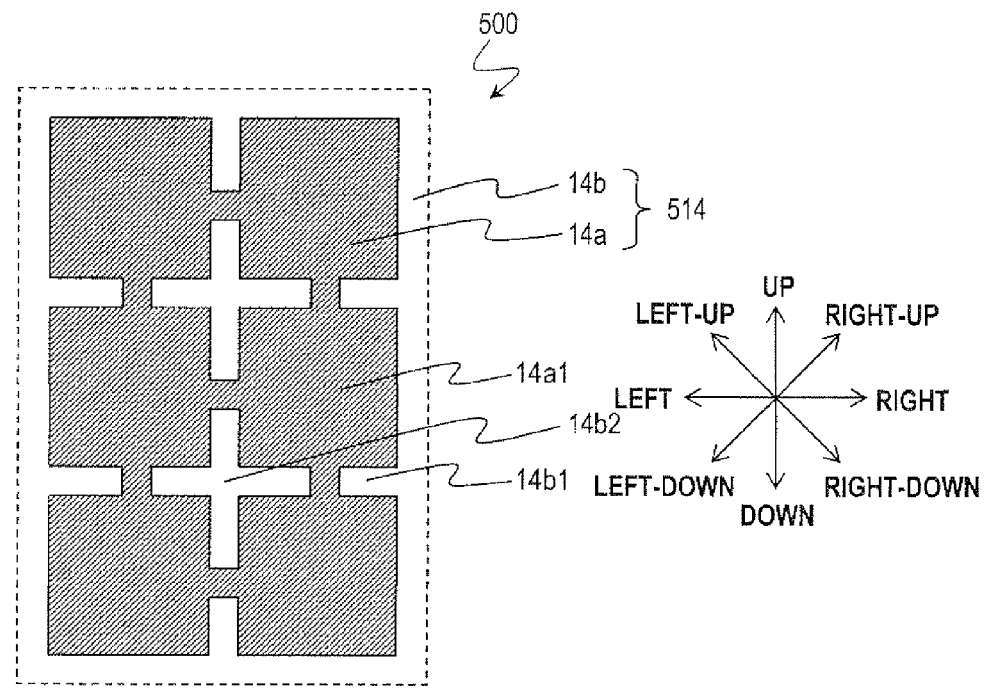
FIG. 8 is a plan view schematically showing a liquid crystal display device 500 as a comparative example including a picture element electrode having generally square unit solid areas.
Figure 9:
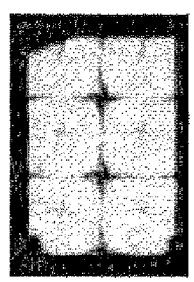
FIGS. 9(a) and (b) are photos showing the orientation in the liquid crystal display device 500; (a) shows the orientation where a voltage close to white voltage (6.0 V) is applied, and (b) shows the orientation where a gray-scale voltage (3.0 V) is applied.
Figure 9:
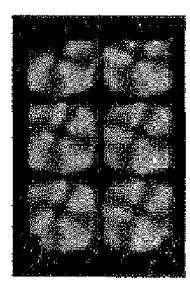

First, the display characteristics of a liquid crystal display device 500 shown in FIG. 8 as a comparative example will be described. In the liquid crystal display device 500 as the comparative example, a unit solid area 14a1 of a picture element electrode 514 is generally square, unlike in the liquid crystal display device 100 in this embodiment. Even where the unit solid area 14a1 is generally square, liquid crystal domains exhibiting a radially inclined orientation are formed when a voltage is applied as shown in the microphotographs in FIGS. 9(a) and (b). FIG. 9(a) shows an orientation where a voltage close to white voltage (voltage for the highest gray-scale level) is applied (in this example, white voltage is 6.2 V; and a voltage of 6.0 V is applied). FIG. 9(b) shows an orientation where a voltage for a certain gray-scale level (specifically, a voltage of 3.0 V) is applied.

Figure 10:
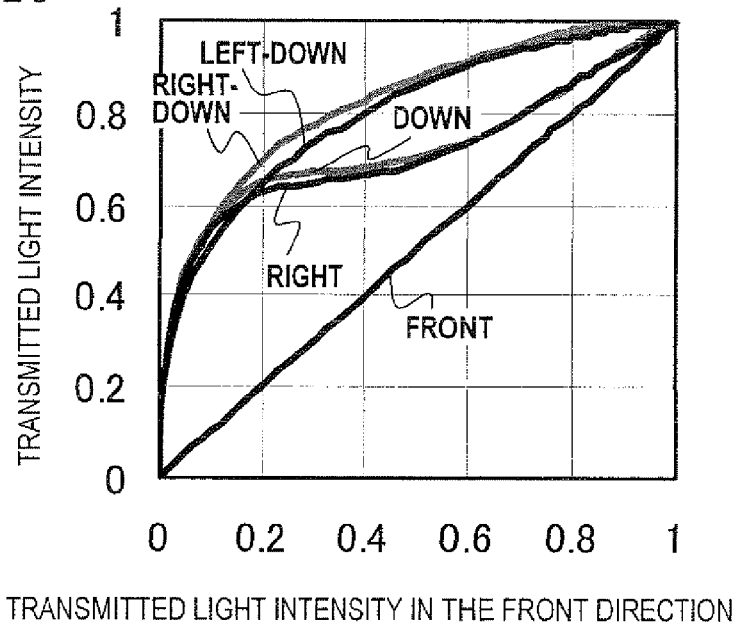
FIG. 10 is a graph showing the viewing angle dependence of the γ characteristic in the liquid crystal display device 500 as the comparative example.

FIG. 10 shows the viewing angle dependence of the γ characteristic in the liquid crystal display device 500 as the comparative example. In the graph in FIG. 10, the horizontal axis represents the transmitted light intensity in the front direction; and the vertical axis represents the transmitted light intensity in the front direction and at viewing angles of 60 degrees downward, 60 degrees in the right-down direction, 60 degrees rightward and 60 degrees in the left-down direction. The graph shows the gradation characteristic in each direction. The transmitted light intensity in each direction is normalized with the transmitted light intensity obtained when white voltage (voltage for the highest gray-scale level) is applied being 1. The expression "viewing angle of 60 degrees" means that the angle with respect to the normal to the display plane is degrees. The specifications of the panel actually produced are as follows.

TABLE 1

| Comparative example | |
|---|---|
| Panel size | 7 inches diagonally |
| Gate voltage Vg | 25 V |
| White voltage (voltage for the highest gray-scale level) | 6.2 V |
| Cell gap (thickness of the liquid crystal layer) | 4.0 μm |
| Size of the unit solid area | 46.5 μm (up-down direction of the display plane) × 44.5 μm (left-right direction of the display plane) |

As understood from FIG. 10, the gradation characteristic in the front direction is represented by a straight line, whereas the gradation characteristics at the other angles (oblique directions) are represented by curves. This means that the γ characteristic of the display is different between the front direction and the oblique directions. The shift amount of the curves, representing the gradation characteristics in the oblique directions, from the straight line representing the gradation characteristic in the front direction, quantitatively indicates the shift amount of the γ characteristic in the respective viewing angles, i.e., the shift amount (difference) between the state of gray-scale display observed in the front direction and the state of gray-scale display observed at the respective viewing angles. The present invention has an objective of reducing the shift amount in a specific direction.

Figure 11:
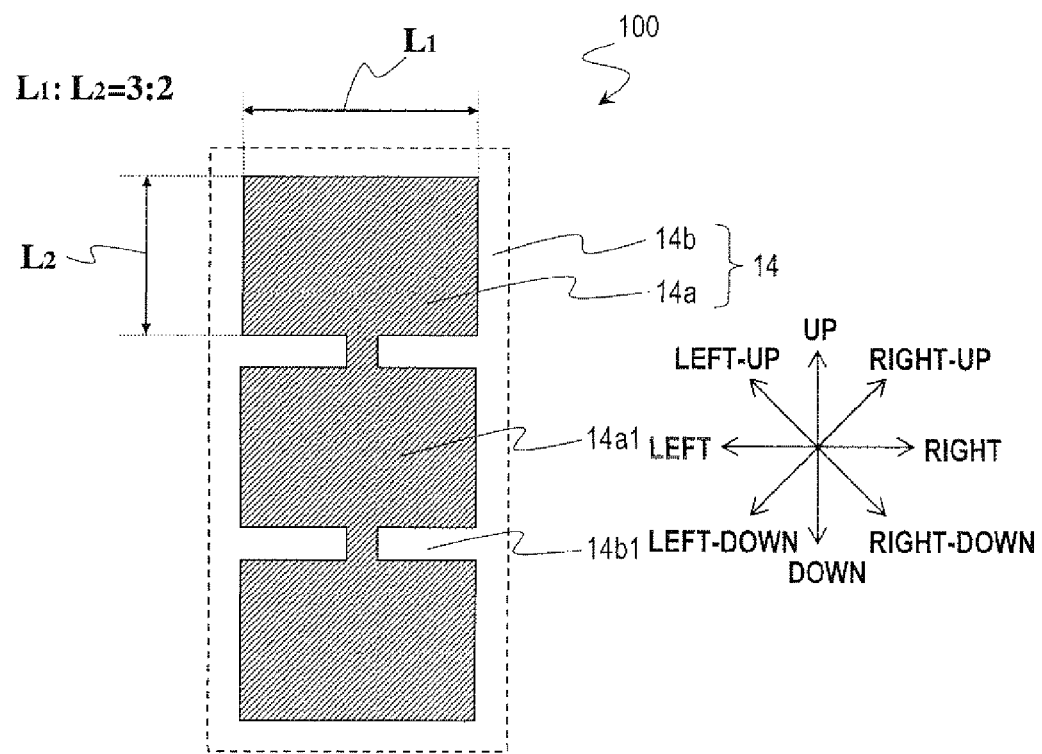
FIG. 11 is a plan view showing a picture element electrode included in a panel as a test model 1.
Figure 12:
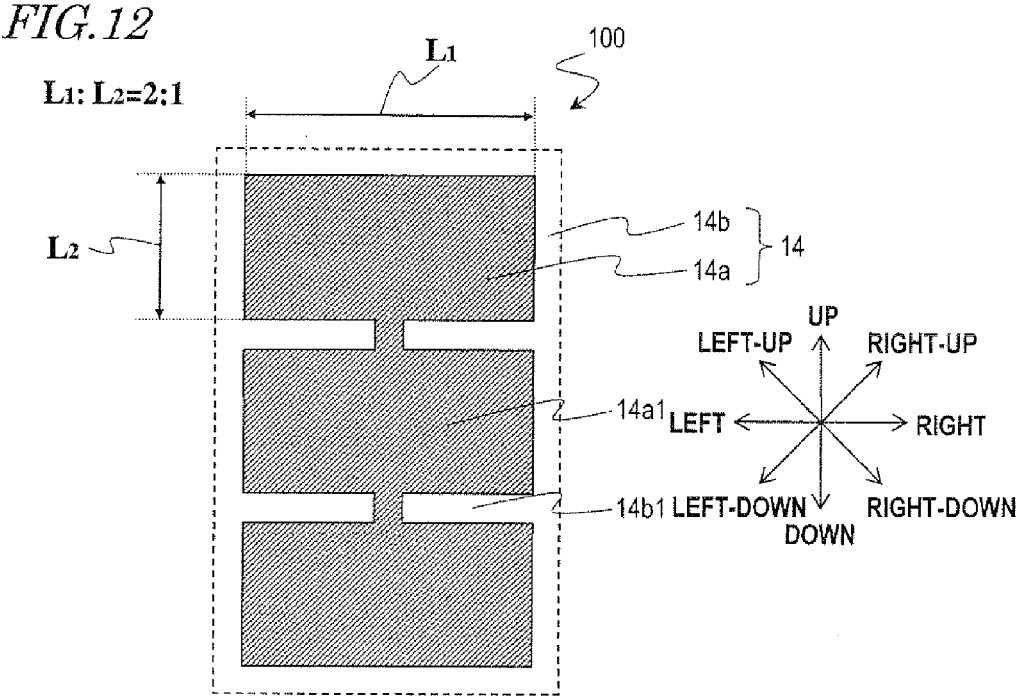
FIG. 12 is a plan view showing a picture element electrode included in a panel as a test model 2.

Now, the display characteristics of the liquid crystal display device 100 in this embodiment will be described. In order to evaluate the display characteristics of the liquid crystal display device 100, the present inventor produced a panel shown in FIG. 11 (test model 1) and a panel shown in FIG. 12 (test model 2). In the test model 1, the ratio between length $L_1$ in the longitudinal direction of the unit solid area 14a1 and length $L_2$ in the shorter direction the unit solid area 14a1, i.e., $L_1/L_2$ is 3/2. In the test model 2, the ratio $L_1/L_2$ is 2. Both test models 1 and 2 are located such that the longitudinal direction thereof is parallel to the left-right direction of the display plane. The specifications of the test models 1 and 2 are the same as those in Table 1 except for the shape and size of the unit solid area 14a1. The size of the unit solid area 14a1 in the test models 1 and 2 is as shown in Table 2.

TABLE 2

|  | Test example 1 | Test example 2 |
|---|---|---|
| Size of the unit solid area | 46.5 μm (up-down direction of the display plane) × 70.0 μm (left-right direction of the display plane) | 46.5 μm (up-down direction of the display plane) × 93.0 μm (left-right direction of the display plane) |

Figure 13:
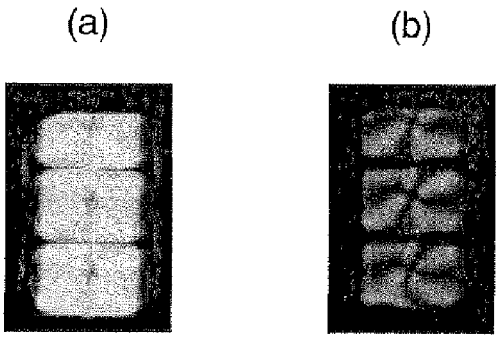
FIGS. 13(a) and (b) are photos showing the orientation in the panel as the test mode 1; (a) shows the orientation where a voltage close to white voltage (6.0 V) is applied, and (b) shows the orientation where a gray-scale voltage (3.0 V) is applied.
Figure 14:
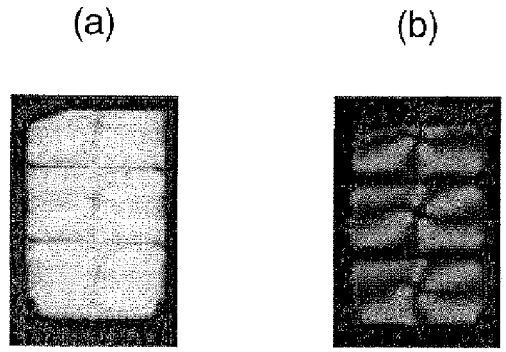
FIGS. 14(a) and (b) are photos showing the orientation in the panel as the test mode 2; (a) shows the orientation where a voltage close to white voltage (6.0 V) is applied, and (b) shows the orientation where a gray-scale voltage (3.0 V) is applied.

FIGS. 13(a) and (b) show the orientation in the test model 1 when a voltage is applied, and FIGS. 14(a) and (b) show the orientation the test model 2 when a voltage is applied. From FIGS. 13(a) and (b) and FIGS. 14(a) and (b), it is understood that a liquid crystal domain is formed above each unit solid area 14a1 when a voltage is applied. In the test model 2, the liquid crystal domains are formed with no problem despite that the aspect ratio (the ratio between the length in the longitudinal direction and the length in the shorter direction) of the unit solid area 14a1 is relatively large.

Figure 15:
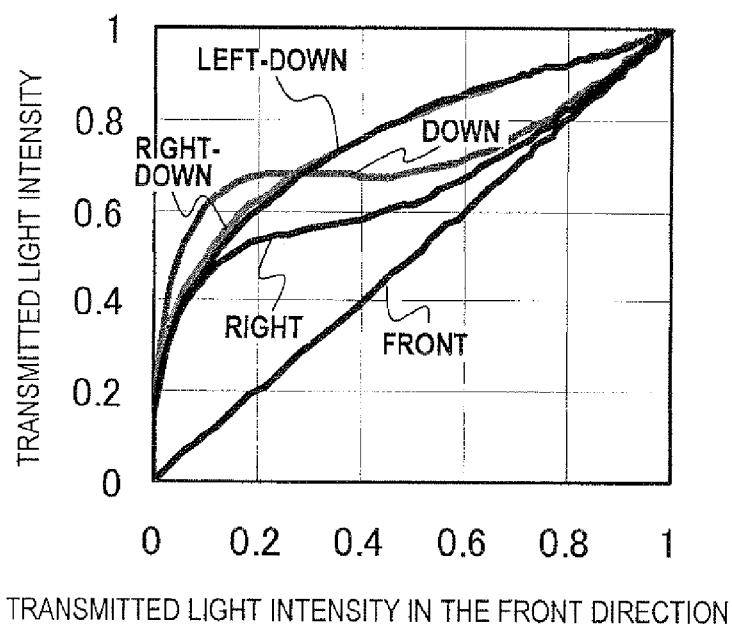
FIG. 15 is a graph showing the viewing angle dependence of the γ characteristic in the panel as the test model 1.
Figure 16:
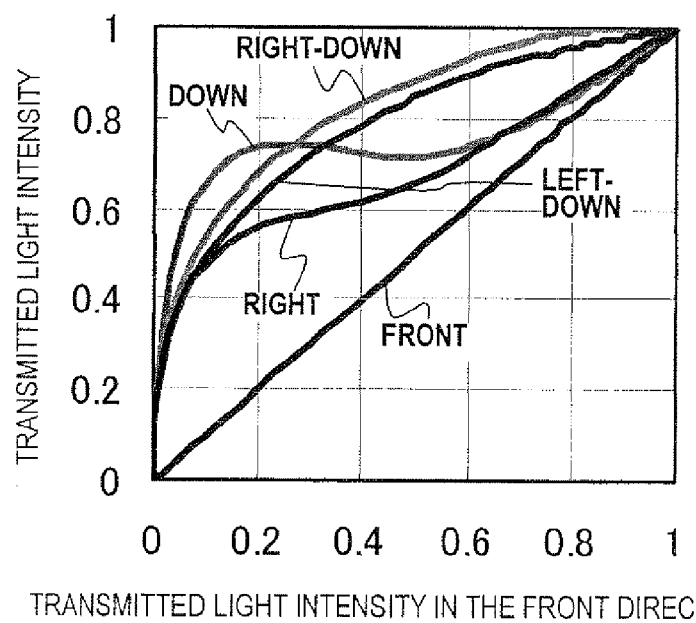
FIG. 16 is a graph showing the viewing angle dependence of the γ characteristic in the panel as the test model 2.

FIG. 15 shows the viewing angle dependence of the γ characteristic of the test model 1, and FIG. 16 shows the viewing angle dependence of the γ characteristic of the test model 2. From a comparison of FIGS. 15 and 16 against FIG. 10, it is understood that in the test models 1 and 2, the shift amount of the curve representing the gradation characteristic at the viewing angle of 60 degrees rightward from the straight line representing the gradation characteristic in the front direction is smaller, and thus the viewing angle dependence of the γ angle is reduced for the left-right direction, as compared with the comparative example.

As described above, the viewing angle dependence of the γ characteristic is reduced for a direction parallel to the longitudinal direction of the unit solid area 14a1. Accordingly, by locating the unit solid area 14a1 such that the longitudinal direction thereof is generally parallel to the direction for which a high viewing angle characteristic is required, the high viewing angle characteristic is obtained for that direction.

The principle by which the shift of the γ characteristic can be alleviated by the present invention, i.e., by locating the rectangular unit solid area 14a1 such that the longitudinal direction thereof is generally parallel to the direction in which the shift of the γ characteristic needs to be alleviated will be described.

As described above, in order to obtain a superb viewing angle characteristic for a particular direction, it is preferable to locate a pair of polarization plates such that the transmission axis of one of the polarization plates is generally parallel to that particular direction. With such an arrangement, the transmission axes are prevented from being shifted from the state of being perpendicular to each other when the viewing angle is increased along that direction (i.e., along the transmission axis of the one polarization plate). For this reason, the viewing angle characteristic is improved for that direction. However, in this case, the liquid crystal molecules 30a inclined parallel to the transmission axis of the other polarization plate cause whitening.

Figure 17:
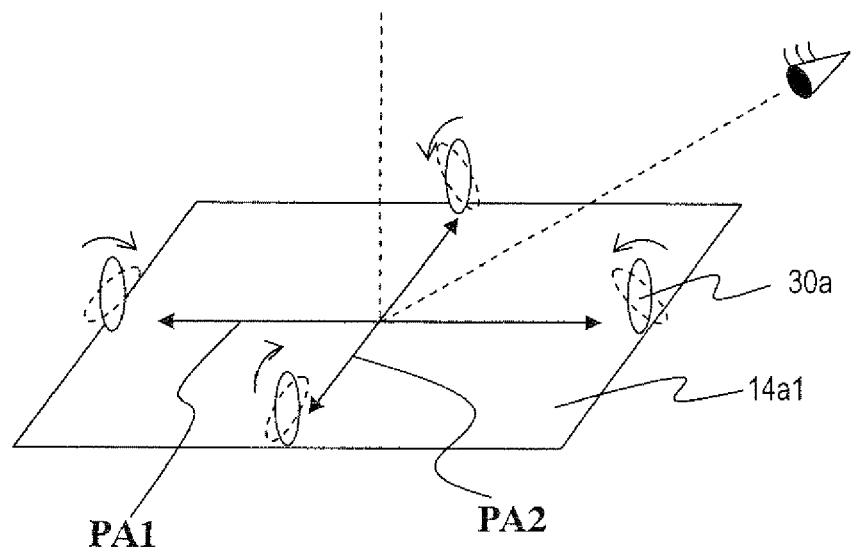
FIG. 17 illustrates the principle by which the shift of the γ characteristic can be alleviated by locating a unit solid area such that the longitudinal direction thereof is generally parallel to the azimuth angle direction in which the shift of the γ characteristic needs to be alleviated.

As shown in FIG. 17, when the viewing angle is increased along one transmission axis PA1, the liquid crystal molecules 30a inclined parallel to the transmission axis PA1 give substantially no phase difference to light obliquely incident on the liquid crystal layer 30 and thus do not influence the display characteristic. However, the liquid crystal molecules 30a inclined parallel to the other transmission axis PA2 give a phase difference to light obliquely incident on the liquid crystal layer 30. A region in which the liquid crystal molecules 30a are thus inclined exhibits a voltage-transmittance characteristic with which the transmittance is maximum at the voltage for the medium gray-scale level. Thus, the liquid crystal molecules 30a inclined parallel to the transmission axis PA2 significantly contribute to the shift of the γ characteristic (i.e., whitening).

In the CPA mode, the liquid crystal molecules 30a incline in a direction perpendicular to an edge of the unit solid area 14a1. Therefore, the existence probability of the liquid crystal molecules 30a oriented in various directions depends on the shape of the unit solid area 14a1. For example, where the unit solid area 14a1 is completely circular, the existence probability of the liquid crystal molecules 30a oriented in various directions is generally equal. By contrast, where the unit solid area 14a1 is rectangular, the existence probability of the liquid crystal molecules 30a oriented in various directions is varied. Specifically, the existence probability of the liquid crystal molecules 30a oriented parallel to the longitudinal direction of the unit solid area 14a1 is relatively higher, and the existence probability of the liquid crystal molecules 30a oriented parallel to the shorter direction of the unit solid area 14a1 is relatively lower.

Therefore, where the rectangular unit solid area 14a1 is located such that the longitudinal direction thereof is generally parallel to the specific direction for which a high viewing angle characteristic is required (i.e., generally parallel to the one transmission axis), the existence probability of the liquid crystal molecules 30a oriented perpendicular to the specific direction (i.e., parallel to the other transmission axis) is decreased. As a result, whitening can be reduced.

Hereinafter, the reason why whitening is reduced by the present invention will be described more specifically based on the results of simulation.

Figure 18:
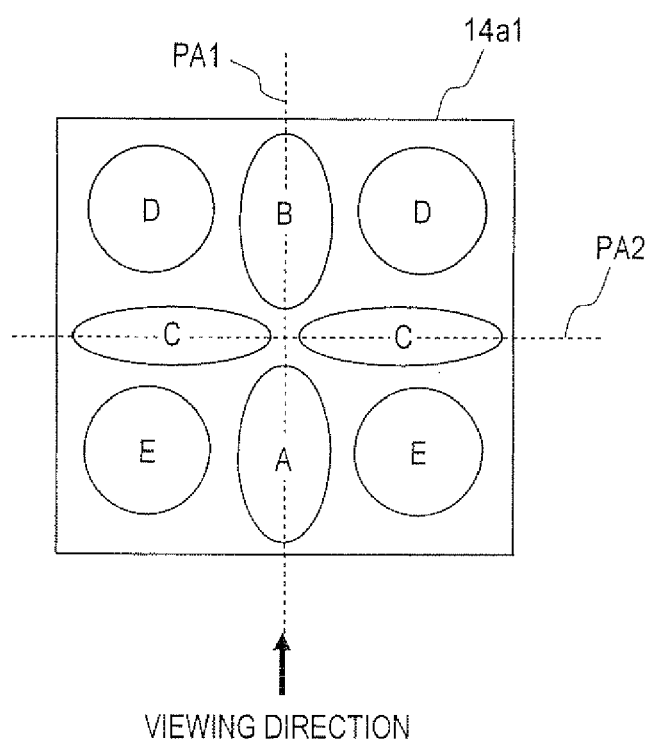
FIG. 18 schematically shows a square unit solid area (the ratio of two adjacent sides is 1:1).
Figure 19:
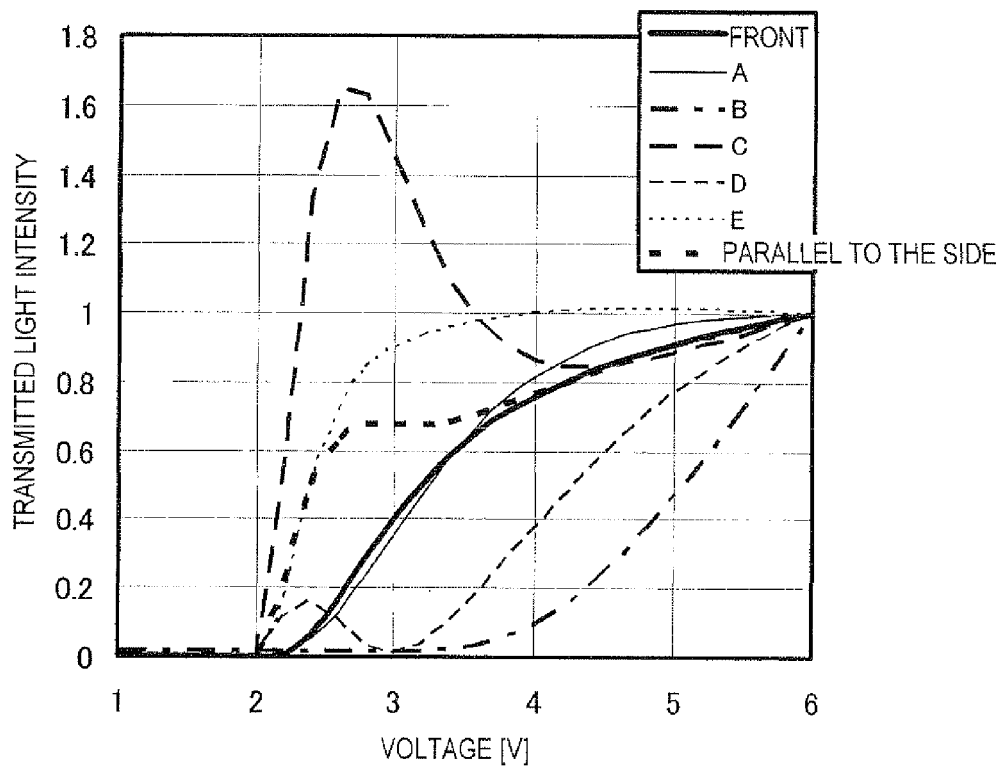
FIG. 19 is a graph showing a voltage-transmitted light intensity characteristic where the unit solid area has the shape shown in FIG. 18.

FIG. 19 shows a voltage-transmitted light intensity characteristic in the case where the unit solid area 14a1 is square (i.e., the ratio of two adjacent sides is 1:1) as shown in FIG. 18. FIG. 19 shows the relationship between the transmitted light intensity in an oblique viewing direction (specifically, a direction in which the viewing angle is increased along the transmission axis PA1 of one of the polarization plates) and the voltage in each of areas A through E. In FIG. 19, the transmitted light intensity is normalized with the transmitted light intensity obtained when white voltage (voltage for the highest gray-scale level) is applied being 1. The simulation conditions are as shown in Table 3.

TABLE 3

| | |
|---|---|
| Refractive index anisotropy Δn of the liquid crystal material | 0.127 |
| Dielectric anisotropy Δε of the liquid crystal material | −3.8 |
| Cell gap (thickness of the liquid crystal layer) | 3.7 μm |
| Chiral pitch | 12 μm |
| Arrangement of the transmission axes of the polarization plates | Crossed-Nicols state in which one transmission axis is parallel to the up-down direction of the display plane, and the other transmission axis is parallel to the left-right direction of the display plane |
| White voltage (voltage for the highest gray-scale level) | 6 V |

Among areas A through E, the inclining directions of the liquid crystal molecules 30a are different. Therefore, as shown in FIG. 19, the transmitted light intensity curves are different among areas A through E. FIG. 19 also shows the transmitted light intensity, in the front direction, of the entire unit solid area 14a1 including areas A through E. As shown in FIG. 19, the transmitted light intensity curves of areas A, B and D are substantially the same as, or below, the transmitted light intensity curve in the front direction. Therefore, in areas A, B and D, whitening does not occur. By contrast, the transmitted light intensity curves of areas C and E are above the transmitted light intensity curve in the front direction. Therefore, in areas C and E, whitening occurs. Especially, the transmitted light intensity curve of area C is significantly shifted from the transmitted light intensity curve in the front direction, and so the degree of whitening in area C is conspicuous. As seen from FIG. 18, area C is a region in which the liquid crystal molecules incline parallel to the transmission axis PA2 of the other polarization plate (i.e., in the direction perpendicular to the direction along which the viewing angle is increased). As understood from this, when the viewing angle is increased along the transmission axis of one polarization plate, the region in which the liquid crystal molecules incline parallel to the transmission axis of the other polarization plate significantly contributes to the reduction in the display quality.

FIG. 19 also shows the transmitted light intensity in an oblique viewing direction, which is parallel to the side of the unit solid area 14a1. Where the unit solid area 14a1 is square, the viewing angle characteristic is the same (namely, the transmitted light intensity curve is the same) in an oblique viewing direction parallel to any of the sides.

Figure 20:
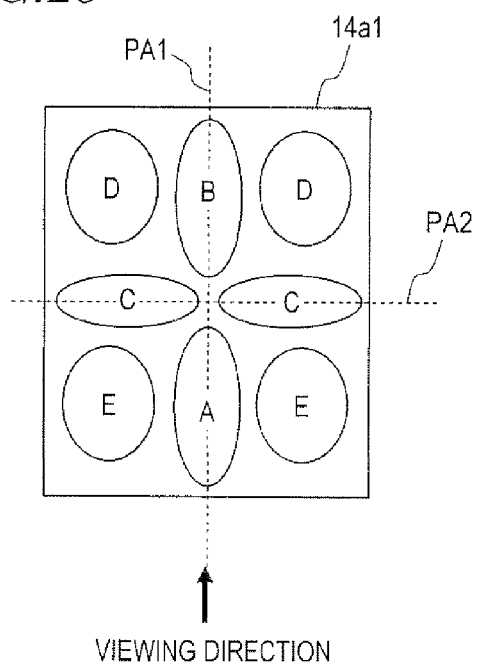
FIG. 20 schematically shows a rectangular unit solid area in which the ratio between the longer side and the shorter side is 1.5:1.
Figure 21:
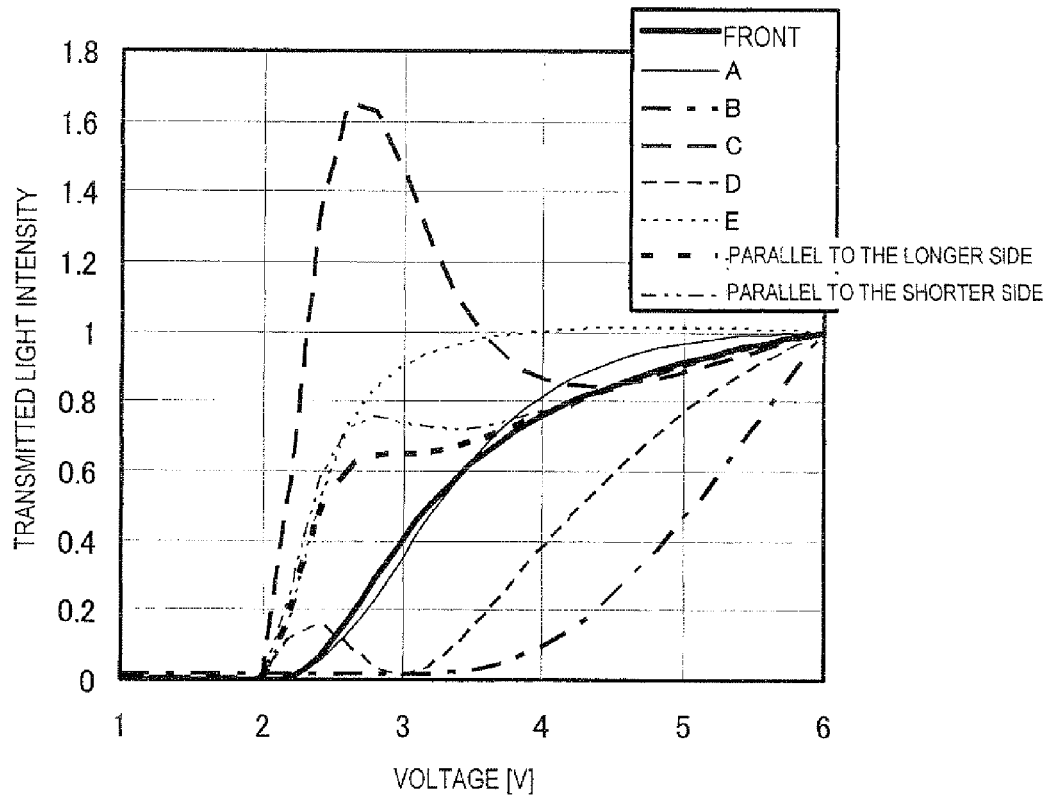
FIG. 21 is a graph showing a voltage-transmitted light intensity characteristic where the unit solid area has the shape shown in FIG. 20.

Now, FIG. 21 shows a voltage-transmitted light intensity characteristic in the case where the unit solid area 14a1 is rectangular in which the ratio between the longer side and the shorter side is 1.5:1 as shown in FIG. 20. As shown in FIG. 21, the transmitted light intensity curves are different among areas A through E, like in the case of FIG. 19.

However, where the unit solid area 14a1 is rectangular, as understood from a comparison of FIG. 18 and FIG. 20, the ratio of area C, which causes whitening when the display is seen in an oblique viewing direction parallel to the longer side of the unit solid area 14a1 is reduced. Therefore, the generation of whitening is suppressed when the viewing angle is increased along the direction parallel to the longer side. FIG. 21 also shows the transmitted light intensity in the oblique viewing direction parallel to the longer side. As understood from a comparison of FIG. 19 and FIG. 21, the shift of the transmitted light intensity curve in the oblique viewing direction parallel to the longer side, from the transmitted light intensity curve in the front direction in FIG. 21, is smaller than the shift of the transmitted light intensity curve in the oblique viewing direction parallel to the side of the square, from the transmitted light intensity curve in the front direction in FIG. 19.

FIG. 21 also shows the transmitted light intensity in an oblique viewing direction which is parallel to the shorter side. As shown in FIG. 21, the transmitted light intensity curve in the oblique viewing direction parallel to the shorter side is different from the transmitted light intensity curve in the oblique viewing direction parallel to the longer side. The viewing angle characteristic is different between the viewing direction parallel to the shorter side and the viewing direction parallel to the longer side.

Figure 22:
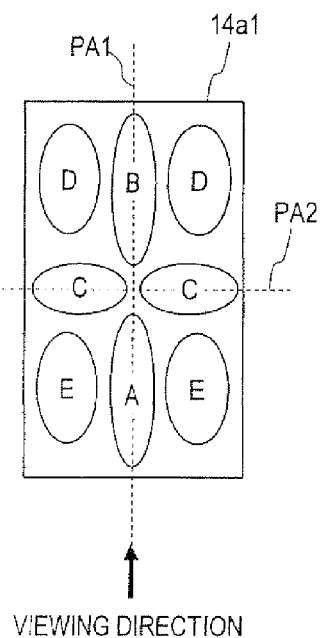
FIG. 22 schematically shows a rectangular unit solid area in which the ratio between the longer side and the shorter side is 2:1.
Figure 23:
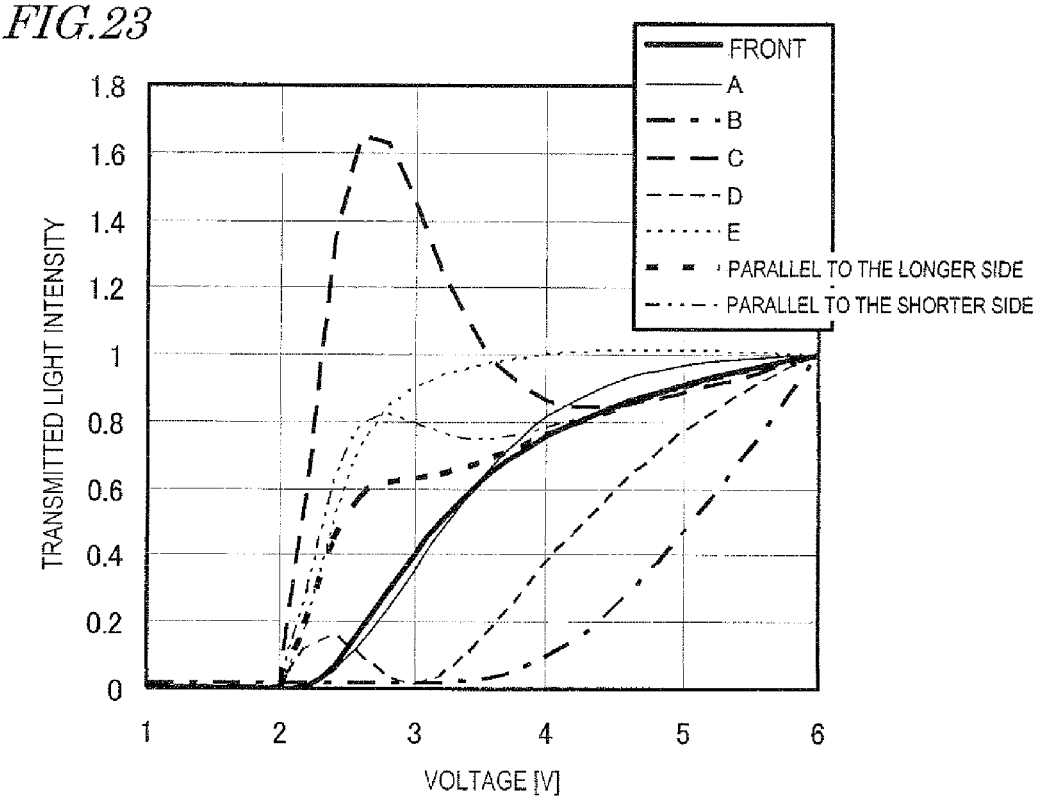
FIG. 23 is a graph showing a voltage-transmitted light intensity characteristic where the unit solid area has the shape shown in FIG. 22.

Now, FIG. 23 shows a voltage-transmitted light intensity characteristic in the case where the unit solid area 14a1 is rectangular in which the ratio between the longer side and the shorter side is 2:1 as shown in FIG. 22. As shown in FIG. 23, the transmitted light intensity curves are different among areas A through E, like in the case of FIG. 21. The shift of the transmitted light intensity curve in the oblique viewing direction parallel to the longer side from the transmitted light intensity curve in the front direction is smaller than the shift in FIG. 19, like in FIG. 21.

However, where the ratio between the longer side and the shorter side of the unit solid area 14a1 is larger, as understood from a comparison of FIG. 20 and FIG. 22, the ratio of area C, which causes whitening, is further reduced. Therefore, the generation of whitening is further suppressed when the viewing angle is increased along the direction parallel to the longer side. As understood from a comparison of FIG. 21 and FIG. 23, the shift of the transmitted light intensity curve in the oblique viewing direction parallel to the longer side from the transmitted light intensity curve in the front direction in FIG. 23 is still smaller than in FIG. 21.

As shown in FIG. 23, the shift between the transmitted light intensity curve in the oblique viewing direction parallel to the shorter side and the transmitted light intensity curve in the oblique viewing direction parallel to the longer side is larger than in FIG. 21. The difference in the viewing angle characteristic between the viewing direction parallel to the shorter side and the viewing direction parallel to the longer side is increased.

As described above, according to the present invention, the unit solid area 14a1 is rectangular, and the longitudinal direction thereof is matched to the specific direction for which a high viewing angle characteristic is required. Thus, the viewing angle dependence of the γ characteristic is alleviated for that specific direction.

For simply improving the viewing angle characteristic in the CPA mode, it is preferable that the liquid crystal molecules are oriented in all azimuth directions at substantially the same probability as described in Patent Document 3. Accordingly, the shape of the unit solid area preferably has a high level of rotational symmetry. A shape such as square with a four-fold rotational symmetry or circle with an axial symmetry is preferable to a shape such as rectangular with a two-fold rotational symmetry. However, according to the present invention, the unit solid area is intentionally shaped rectangular, and the longitudinal direction thereof is matched to the specific direction for which a high viewing angle characteristic is required. Thus, an unexpected effect that the viewing angle dependence of the γ characteristic can be alleviated selectively for that specific direction is provided.

In which direction a high viewing angle characteristic is required depends on the use of the liquid crystal display device. The azimuth direction to which the longitudinal direction of the unit solid area 14a1 is to be matched may be appropriately selected in accordance with the use. For example, for a liquid crystal TV, the viewing angle is often increased along the horizontal direction (left-right direction) of respect to the display plane. Therefore, it is desirable that the viewing angle characteristic is high for the horizontal direction. Hence, for the liquid crystal TV, it is preferable to locate the unit solid area 14a1 such that the longitudinal direction thereof is generally parallel to the horizontal direction of the display plane.

Now, a preferable range of the ratio $L_1/L_2$ will be described, where $L_1$ is the length in the longitudinal direction of the unit solid area 14a1 (length in direction D1) and $L_2$ is the length in the shorter direction (length in direction D2 perpendicular to direction D1). The present inventor produced a plurality of test panels with different values of $L_1/L_2$, in which the unit solid area 14a1 is located such that the longitudinal direction thereof is parallel to the left-right direction of the display plane. The display characteristics of the panels were evaluated.

Figure 24:
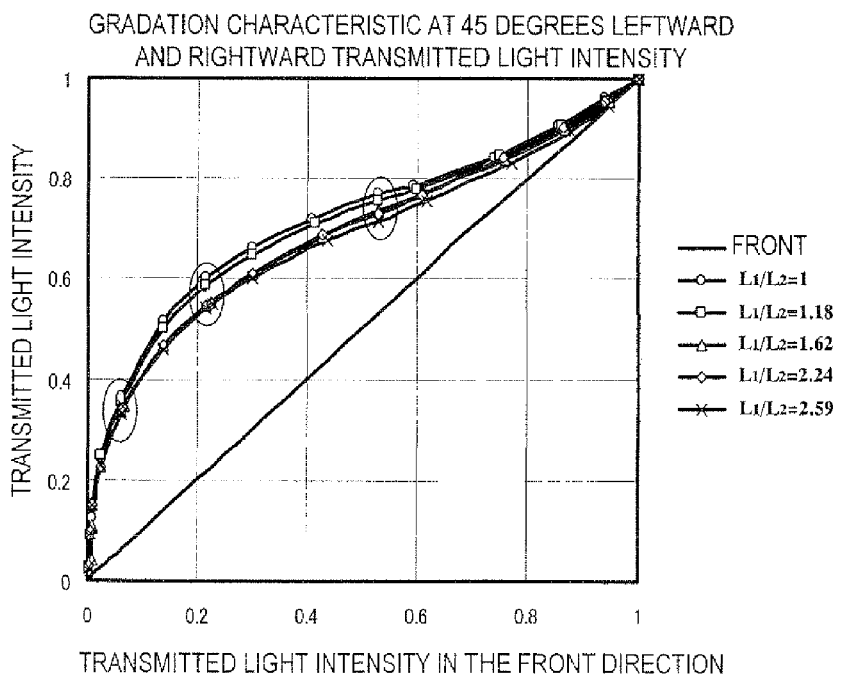
FIG. 24 is a graph showing a gradation characteristic at a viewing angle of 45 degrees leftward/rightward when the ratio $L_1/L_2$ is varied where $L_1$ is the length of the unit solid area in the longitudinal direction and $L_2$ is the length of the unit solid area in the shorter direction.
Figure 25:
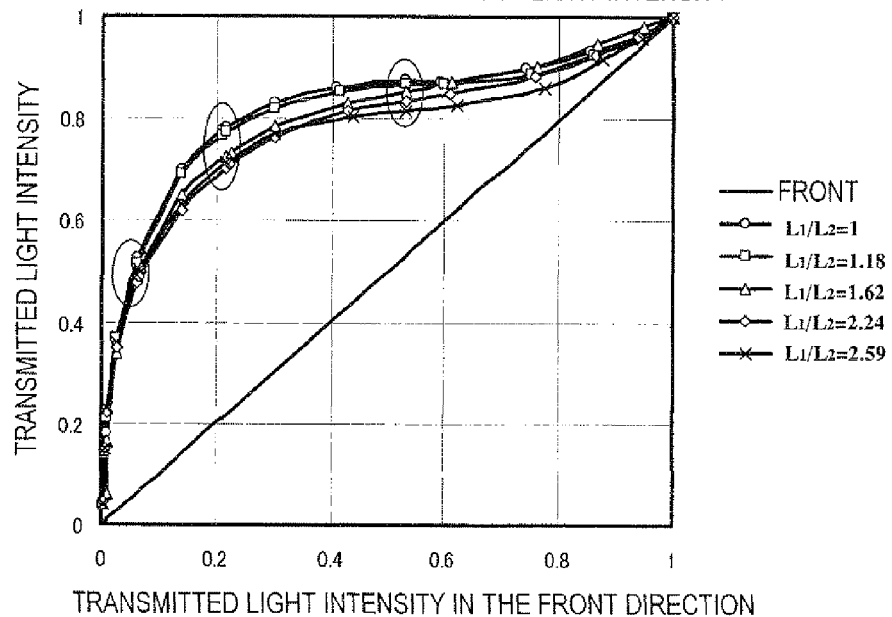
FIG. 25 is a graph showing a gradation characteristic at a viewing angle of 60 degrees leftward/rightward when the ratio $L_3/L_2$ is varied.

FIG. 24 shows the gradation characteristic at a viewing angle of 45 degrees leftward/rightward. FIG. 25 shows the gradation characteristic at a viewing angle of 60 degrees leftward/rightward. The specifications of the test panels and the measuring device are as shown in Table 4.

TABLE 4

| | |
|---|---|
| Size of the unit solid area (when $L_1/L_2 = 1$) | 34.5 μm (up-down direction of the display plane) × 34.5 μm (left-right direction of the display plane) |
| Refractive index anisotropy Δn of the liquid crystal material | 0.11 |
| Dielectric anisotropy Δε of the liquid crystal material | −5 |
| Cell gap (thickness of the liquid crystal layer) | 3.6 μm |
| Arrangement of the transmission axes of the polarization plates | Crossed-Nicols state in which one transmission axis is parallel to the up-down direction of the display plane, and the other transmission axis is parallel to left-right direction of the display plane |
| Black voltage (voltage for the lowest gray-scale level) | 1.7 V |
| White voltage (voltage for the highest gray-scale level) | 4.4 V |
| Measuring device | EZContrast produced by ELDIM |

From FIG. 24, it is understood that the gradation characteristic at the viewing direction of 45 degrees leftward/rightward changes in accordance with the value of $L_1/L_2$, namely, has a correlation with the value of $L_1/L_2$. Similarly, from FIG. 25, it is understood that the gradation characteristic at the viewing direction of 60 degrees leftward/rightward changes in accordance with the value of $L_1/L_2$, namely, has a correlation with the value of $L_1/L_2$. Hereinafter, the relationship between the gradation characteristic and $L_1/L_2$ will be described more specifically.

Figure 26:
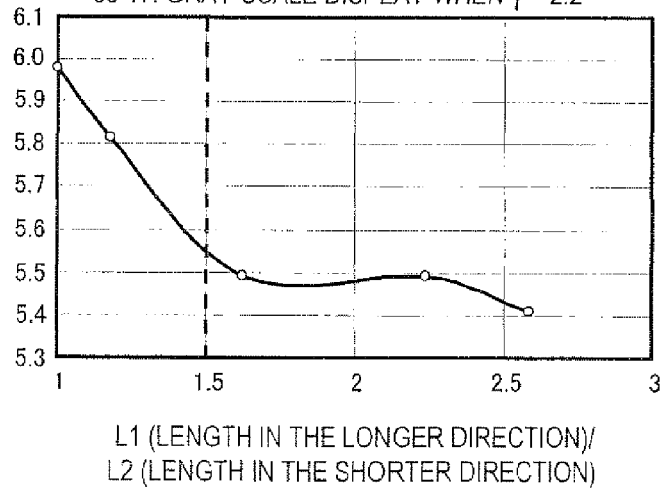
FIG. 26 is a graph showing the relationship between the ratio of the transmitted light intensity at a viewing direction of 45 degrees leftward/rightward with respect to the transmitted light intensity in the front direction and $L_1/L_2$ for 63-th gray-scale display when $\gamma=2.2$.
Figure 27:
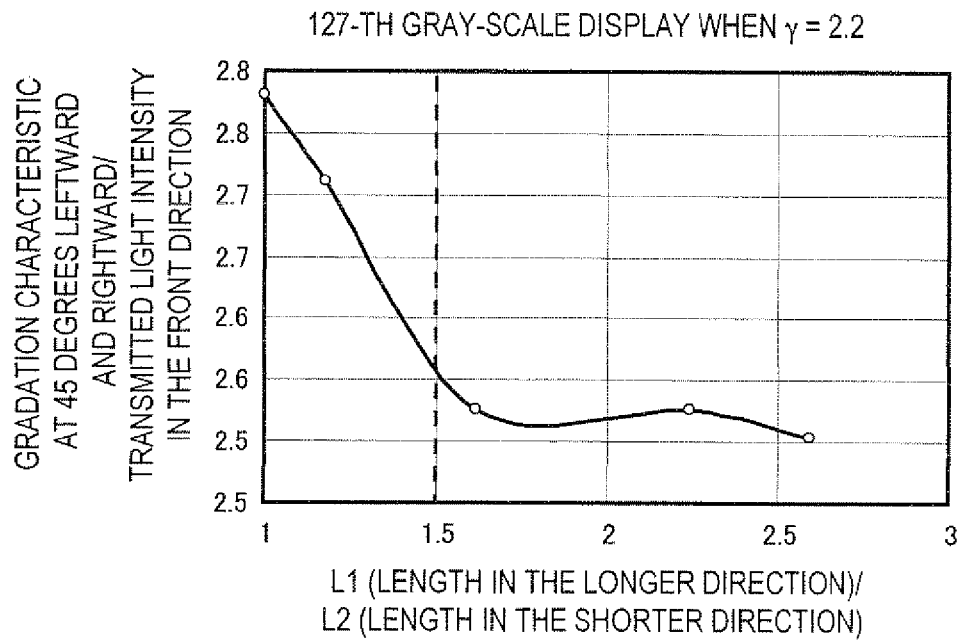
FIG. 27 is a graph showing the relationship between the ratio of the transmitted light intensity at a viewing direction of 45 degrees leftward/rightward with respect to the transmitted light intensity in the front direction and $L_1/L_2$ for 127-th gray-scale display when $\gamma=2.2$.
Figure 28:
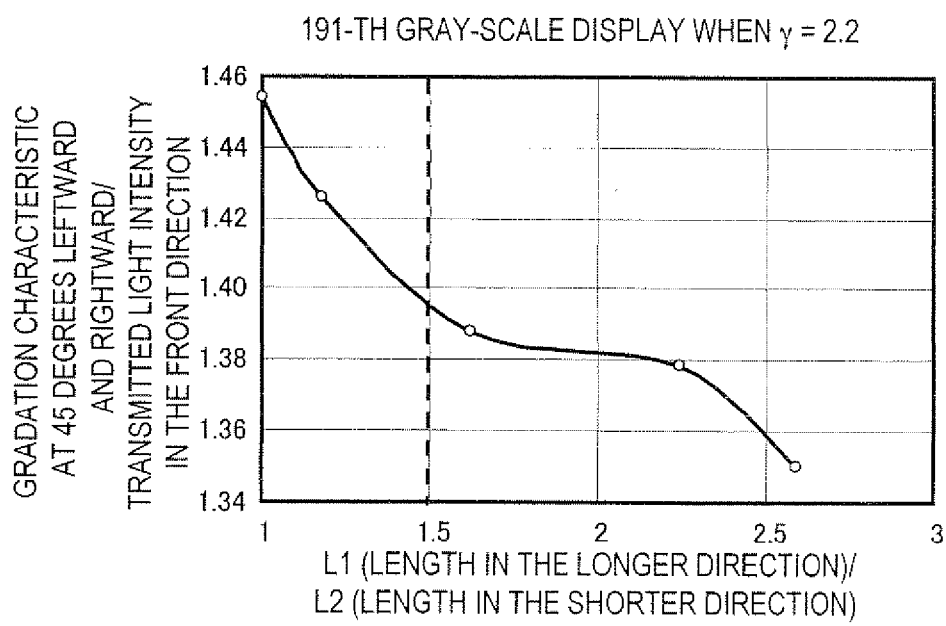
FIG. 28 is a graph showing the relationship between the ratio of the transmitted light intensity at a viewing direction of 45 degrees leftward/rightward with respect to the transmitted light intensity in the front direction and $L_1/L_2$ for 191-th gray-scale display when $\gamma=2.2$.

FIGS. 26, 27 and 28 show the relationship between the ratio of the transmitted light intensity at the viewing direction of 45 degrees leftward/rightward with respect to the transmitted light intensity in the front direction, and $L_1/L_2$. FIGS. 26, 27 and 28 respectively shows the above relationship for 63-th gray-scale display, 127-th gray-scale display, and 191-th gray-scale display (corresponding to the parts enclosed by the ellipse in FIG. 24) when γ=2.2.

As the ratio of the transmitted light intensity in an oblique direction with respect to the transmitted light intensity in the front direction is closer to 1, the shift between the gradation characteristic in the oblique direction and the gradation characteristic in the front direction is smaller. From FIGS. 26, 27 and 28, it is understood that when $L_1/L_2$ is 1.5 or greater, the viewing angle characteristic does not change much and is stable.

Figure 29:
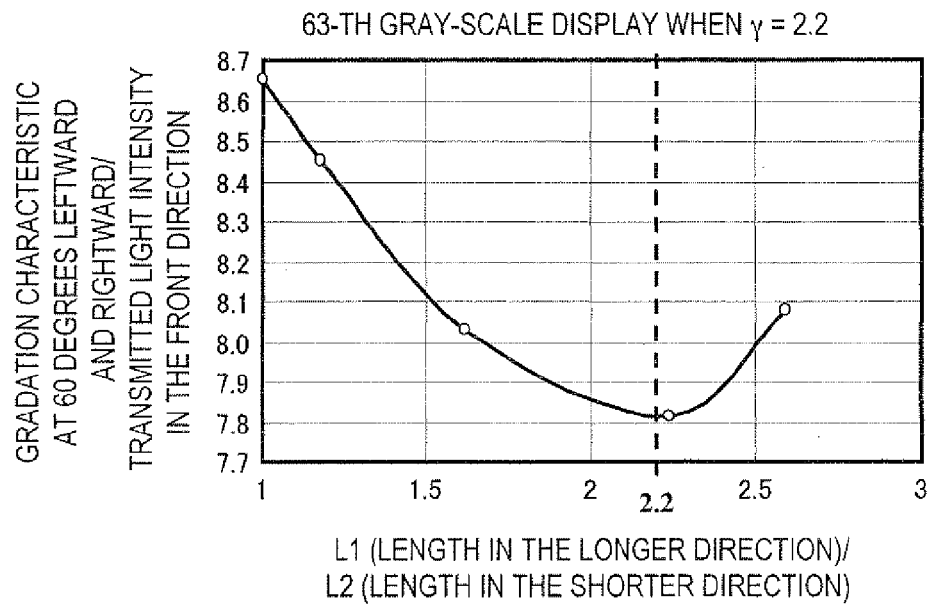
FIG. 29 is a graph showing the relationship between the ratio of the transmitted light intensity at a viewing direction of 60 degrees leftward/rightward with respect to the transmitted light intensity in the front direction and $L_1/L_2$ for 63-th gray-scale display when $\gamma=2.2$.
Figure 30:
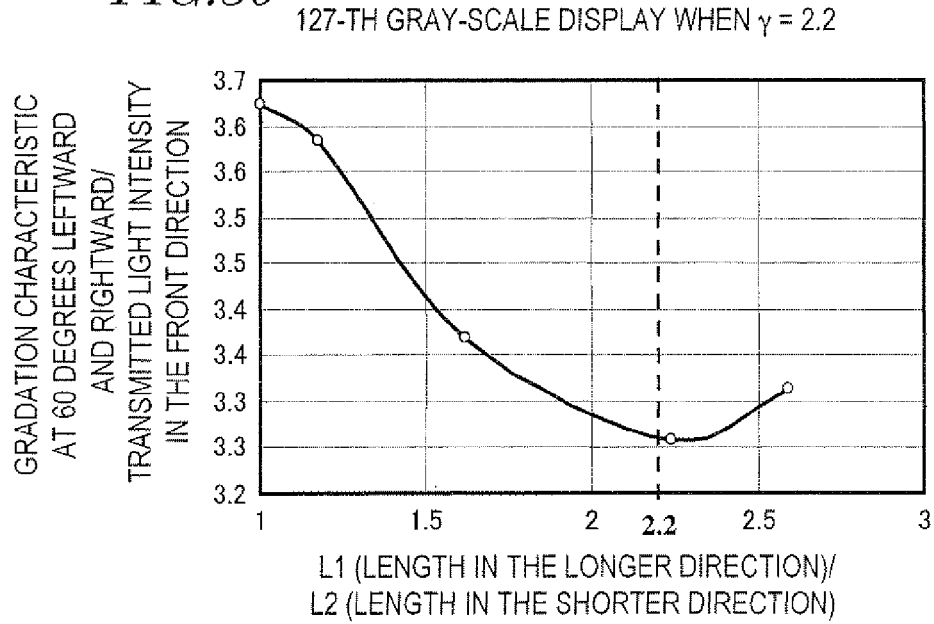
FIG. 30 is a graph showing the relationship between the ratio of the transmitted light intensity at a viewing direction of 60 degrees leftward/rightward with respect to the transmitted light intensity in the front direction and $L_1/L_2$ for 127-th gray-scale display when $\gamma=2.2$.
Figure 31:
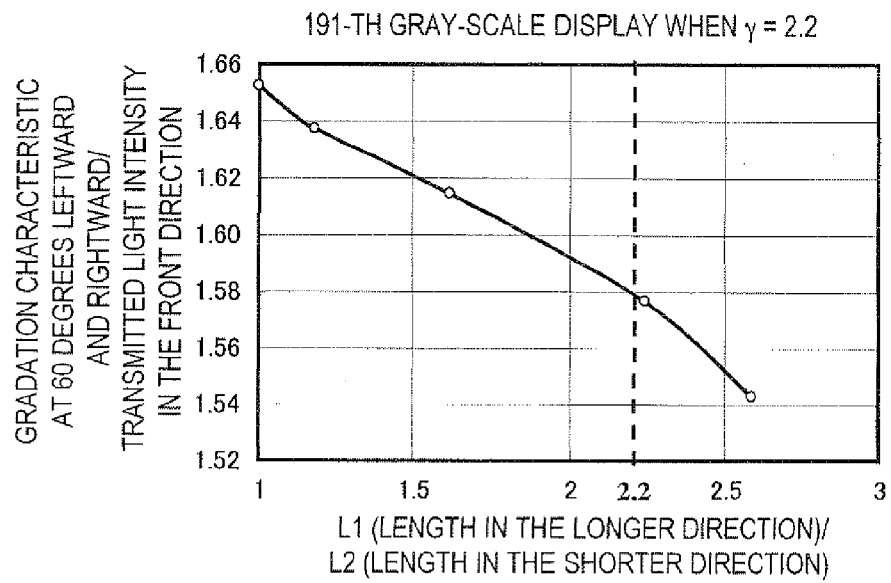
FIG. 31 is a graph showing the relationship between the ratio of the transmitted light intensity at a viewing direction of 60 degrees leftward/rightward with respect to the transmitted light intensity in the front direction and $L_1/L_2$ for 191-th gray-scale display when $\gamma=2.2$.

FIGS. 29, 30 and 31 show the relationship between the ratio of the transmitted light intensity at the viewing direction of 60 degrees leftward/rightward with respect to the transmitted light intensity in the front direction, and $L_1/L_2$. FIGS. 29, 30 and 31 respectively shows the above relationship for 63-th gray-scale display, 127-th gray-scale display, and 191-th gray-scale display (corresponding to the parts enclosed by the ellipse in FIG. 25) when γ=2.2.

FIGS. 29, 30 and 31, it is understood that when $L_1/L_2$ exceeds 2.2, the shift in the gradation characteristic is large and the viewing angle characteristic deteriorates. Namely, as long as $L_1/L_2$ is 2.2 or less, the viewing angle characteristic does not change much and is stable.

As described above, in order to obtain a good viewing angle characteristic, $L_1/L_2$ is preferably 1.5 or greater, or 2.2 or less, and more preferably in the range of 1.5 or greater and 2.2 or less.

Figure 32:
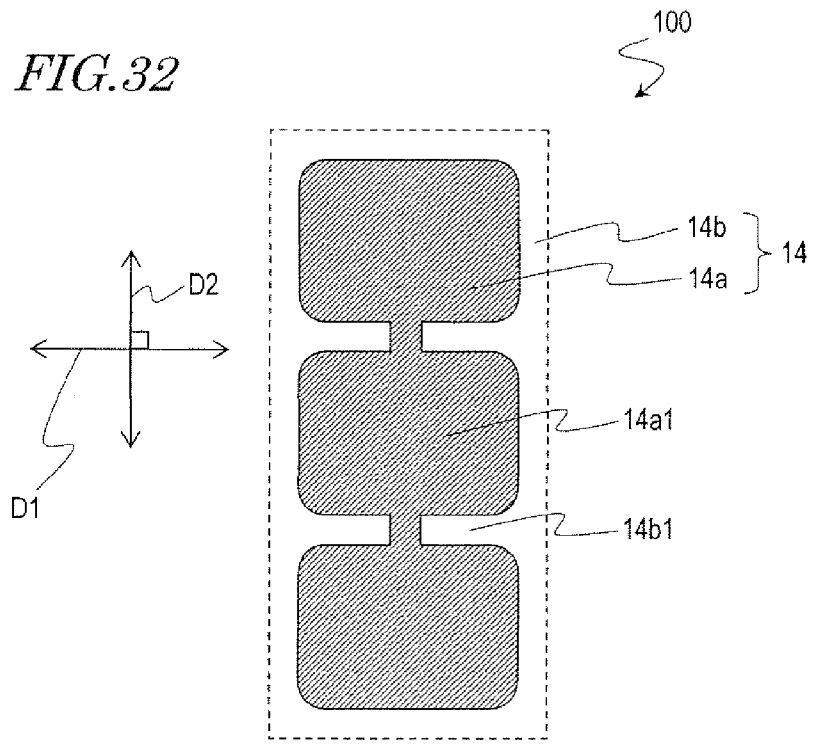
FIG. 32 is a plan view schematically showing another picture element electrode usable for the liquid crystal display device according to the present invention.
Figure 33:
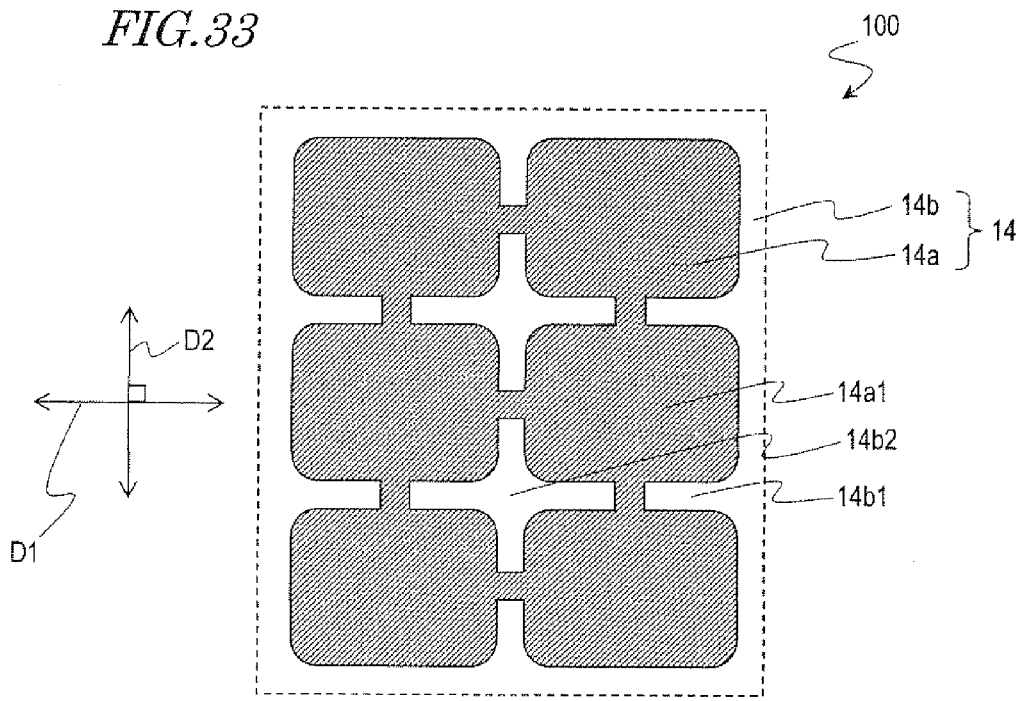
FIG. 33 is a plan view schematically showing still another picture element electrode usable for the liquid crystal display device according to the present invention.

The unit solid area 14a1 does not need to be strictly rectangular as shown in FIG. 1(a) or FIG. 6. Substantially the same effect is provided as long as the unit solid area 14a1 is generally rectangular. For example, as shown in FIGS. 32 and 33, the unit solid area 14a1 may be of a general rectangle having generally arcked corners. Where the unit solid area 14a1 has generally arcked corners, the orientation direction of the liquid crystal molecules changes continuously (smoothly) in the regions corresponding to the corners and so the orientation is highly stable. The unit solid area 14a1 does not even need to be rectangular or generally rectangular. Substantially the same effect is provided as long as the unit solid area 14a1 has a shape (e.g., elliptic shape) in which the length in direction D1 for which a high viewing angle characteristic is required is greater than the length in direction D2 perpendicular to direction D1 (i.e., $L_1/L_2>1$).

The structure of the liquid crystal display device 100 in this embodiment is the same as that of a known liquid crystal display device of a vertical alignment type, except that the picture element electrode 14 has a predetermined pattern so as to include a solid area 14a and a non-solid area 14b. Therefore, the liquid crystal display device 100 can be produced by a known method. Typically, a vertical alignment film (not shown) as a vertical alignment layer is provided on a surface of each of the picture element electrode 14 and the counter electrode 22 on the side of the liquid crystal layer 30, in order to allow the liquid crystal molecules having a negative dielectric anisotropy to be aligned vertically.

Embodiment 2

Figure 34:
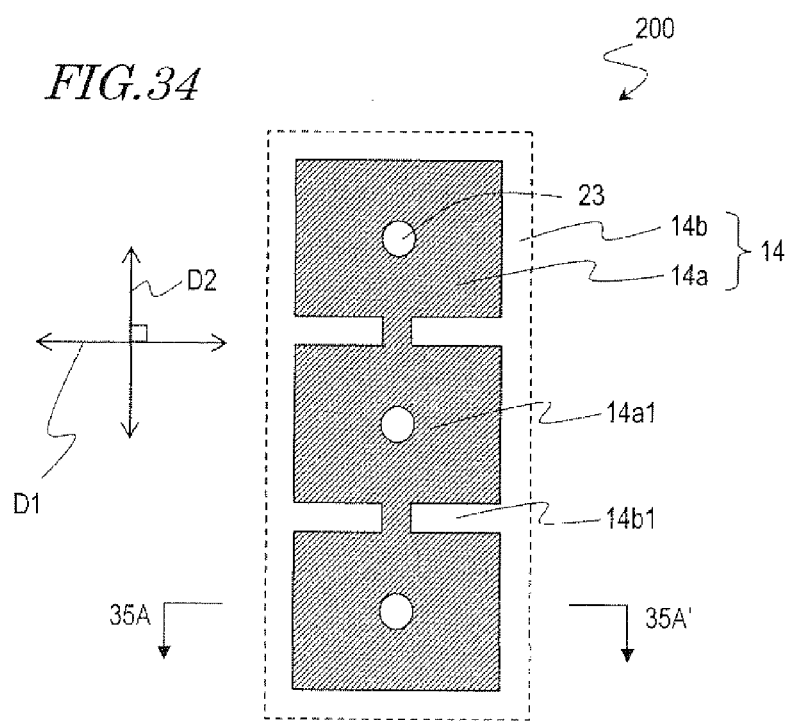
FIG. 34 is a plan view schematically showing a structure of one picture element region of another liquid crystal display device 200 according to the present invention.

FIG. 34 shows a liquid crystal display device 200 in this embodiment. In the liquid crystal display device 200, the counter substrate has a protrusion 23 as an orientation regulating structure, unlike in the liquid crystal display device 100 in Embodiment 1.

Figure 35:
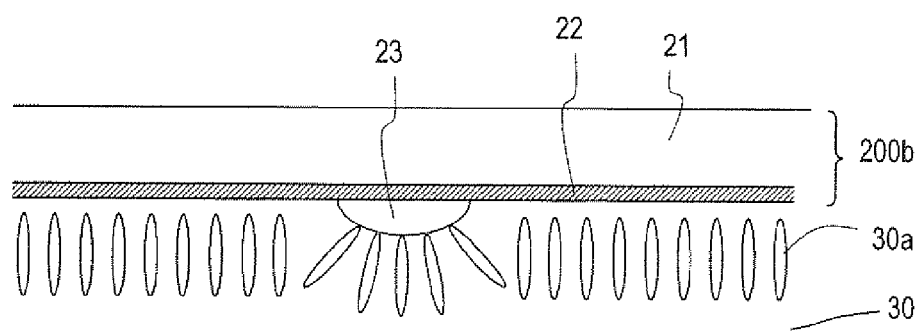
FIG. 35 is a cross-sectional view of FIG. 34 taken along line 35A-35A" which schematically shows, in enlargement, an area in the vicinity of a protrusion 23 of a counter substrate 200b included in the liquid crystal display device 200.

FIG. 35 shows, in enlargement, a counter substrate 200b having the protrusion 23 as the orientation regulating structure. As shown in FIG. 35, the counter substrate 200b has the protrusion 23 provided on the counter electrode 22 and protruding into the liquid crystal layer 30. As shown in FIG. 34, the protrusion 23 is provided in a region corresponding to the center, or the vicinity thereof, of the liquid crystal domain (i.e., a region facing the center, or the vicinity thereof, of the unit solid area 14a1). On a surface of the counter substrate 200b which is on the side of the liquid crystal layer 30, a vertical alignment film (not shown) is provided so as to cover the protrusion 23 and the counter electrode 22.

The protrusion 23 causes the liquid crystal molecules 30a to be oriented in a radially inclined state, by the effect provided by the shape of a surface thereof (having a vertical orientation property). The protrusion 23 is provided in a region corresponding to the center, of the vicinity thereof, of the liquid crystal domain. Therefore, the inclining direction of the liquid crystal molecules caused by the protrusion 23 is in conformity to the orientation direction of the radially inclined orientation of the liquid crystal domain formed in a region corresponding to the unit solid area 14a1. The protrusion 23 expresses an orientation regulating force regardless of whether a voltage is applied or not.

There is no specific limitation on the material used for forming the protrusion 23, but the protrusion 23 may be easily formed using a dielectric material such as a resin or the like. A thermally deformable resin material is preferable because with such a material, the protrusion 23 having a gently sloped hill-like cross-section as shown in FIG. 35 can be easily formed by a post-patterning heat treatment. The protrusion 23 having a gently curved cross-section with an apex (e.g., a part of a sphere) as shown in the figure or a cone-like protrusion provides a superb effect of securing the central position of the radially inclined orientation.

Figure 36:
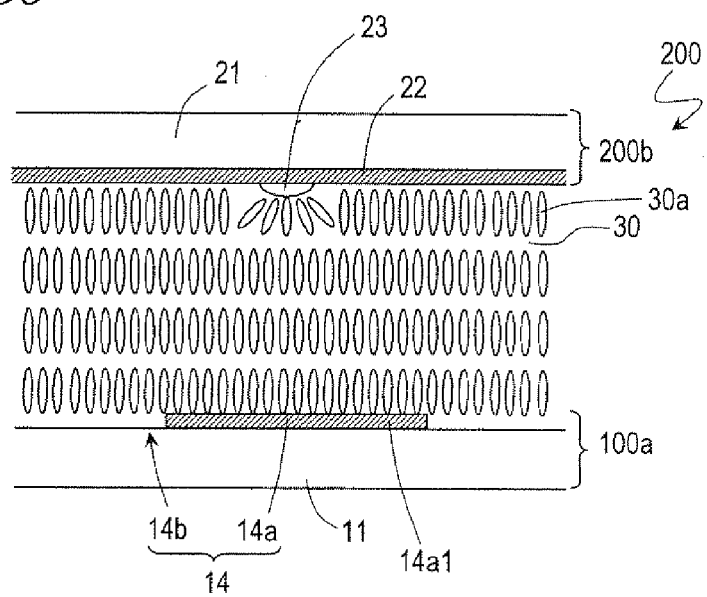
FIGS. 36(a) through (c) schematically show a change of orientation in a liquid crystal layer 30 of the liquid crystal display device 200; (a) shows a state with no voltage; (b) shows a state where the orientation has just started to change (initial ON state), and (c) shows a steady state.
Figure 36:
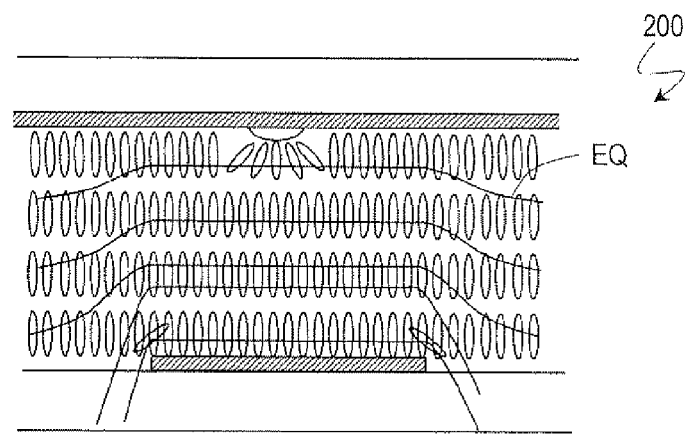
Figure 36:
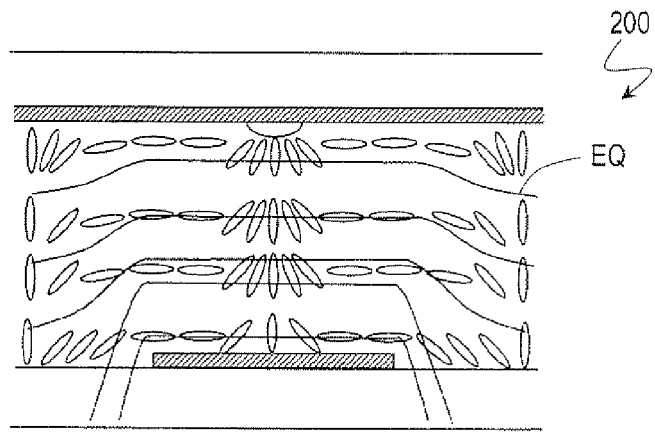

The liquid crystal display device 200 includes the picture element electrode 14 having an outer profile defined to express an orientation regulating force for forming a liquid crystal domain above the unit solid area 14a1, and a protrusion 23 expressing an orientation regulating force conformed to the orientation regulating force of the picture element electrode 14. Owing to such a structure, the liquid crystal display device 200 provides a stable radially inclined orientation. This is schematically shown in FIGS. 36(a) through (c). FIG. 36(a) shows a state with no voltage. FIG. 36(b) shows a state where the orientation has just started to change (initial ON state) after a voltage is applied. FIG. 36(c) schematically shows a steady state in the presence of the voltage.

As shown in FIG. 36(a), the orientation regulating force provided by the protrusion 23 acts on the liquid crystal molecules 30a located in the vicinity thereof to form a radially inclined orientation even in the absence of an applied voltage.

When a voltage starts to be applied, an electric field represented by the equipotential lines EQ shown in FIG. 36(b) is generated (due to the electrode structure of the TFT substrate 100a). In a region corresponding to the unit solid area 14a1, a liquid crystal domain in which the liquid crystal molecules 30a exhibit a radially inclined orientation is formed. Then, the steady state shown in FIG. 36(c) is realized. At this point, the inclining direction of the liquid crystal molecules 30a in each liquid crystal domain matches the inclining direction of the liquid crystal molecules 30a caused by the orientation regulating force of the protrusion 23 provided in the corresponding region.

When a stress is applied to the liquid crystal display device 200 in a steady state, the radially inclined orientation in the liquid crystal layer 30 is once destroyed. When the stress is removed, however, the liquid crystal molecules 30a are recovered to the radially inclined orientation state because an orientation regulating force provided by the unit solid area 14a1 and the protrusion 23 is acting on the liquid crystal molecules 30a. Thus, the generation of an afterimage, which would be caused by the stress, is suppressed. When the orientation regulating force provided by the orientation regulating structure is too strong, retardation occurs due to the radially inclined orientation even where no voltage is applied. This may decrease the contrast ratio of the display. However, the orientation regulating force of the orientation regulating structure is provided only for stabilizing the radially inclined orientation formed by the oblique electric field and securing the position of the central axis thereof. Such an orientation regulating force does not need to be strong and works sufficiently well with such a level that does not generate retardation that would decrease the display quality.

In the liquid crystal display device 200 in this embodiment also, as shown in FIG. 34, the unit solid area 14a1 is located such that the longitudinal direction thereof is generally parallel to direction D1 for which a high viewing angle characteristic is required. Therefore, a high viewing angle characteristic is realized for direction D1.

Embodiment 3

Figure 37:
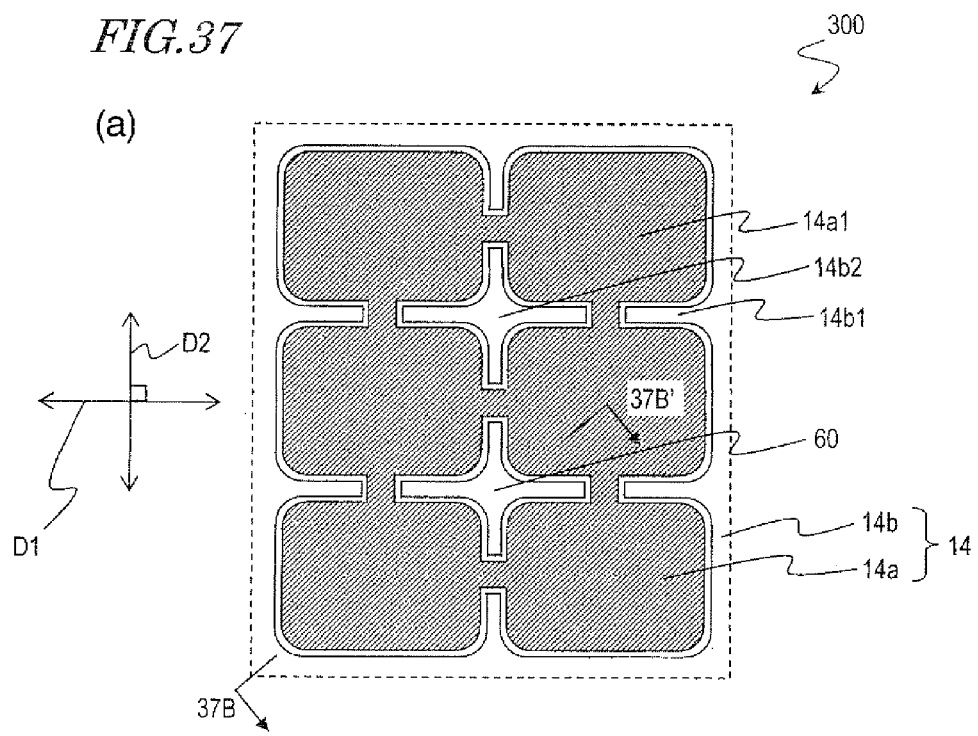
FIGS. 37(a) and (b) schematically show a structure of one picture element region of still another liquid crystal display device 300 according to the present invention; (a) is a plan view, and (b) is a cross-sectional view taken along line 37B-37B' in (a).
Figure 37:
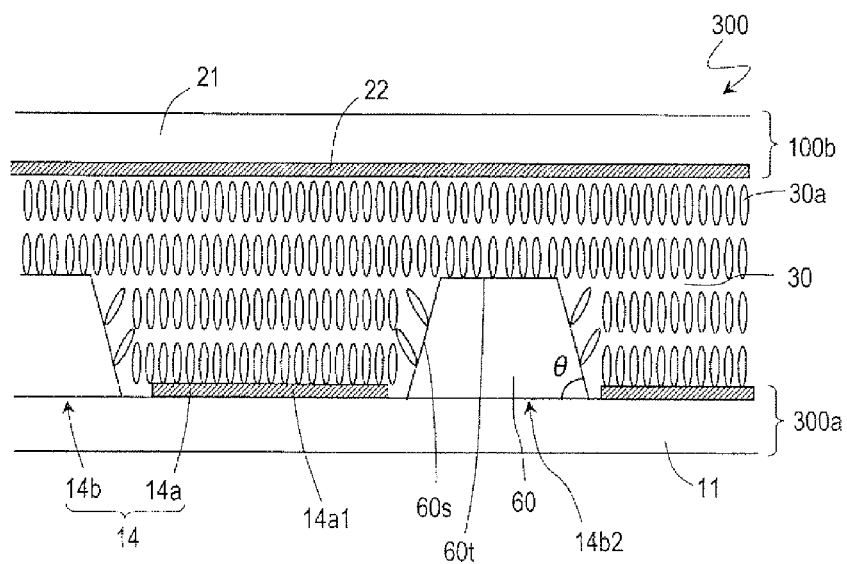

With reference to FIGS. 37(a) and (b), a structure of a liquid crystal display device 300 in this embodiment will be described. FIG. 37(a) is a plan view as seen in the direction of the normal to the substrate, and FIG. 37(b) is a cross-sectional view taken along line 37B-37B' in FIG. 37(a), FIG. 37(b) shows a state in which no voltage is applied across the liquid crystal layer.

As shown in FIGS. 37(a) and (b), in the liquid crystal display device 300, the TFT substrate 100a includes a protrusion 60 provided on the non-solid area 14b of the picture element electrode 14. A vertical alignment film (not shown) is provided on a surface of the protrusion 60.

As shown in FIG. 37(a), the cross-section of the protrusion 60 in an in-plane direction of the substrate 11 matches the shape of the boundary between the solid area 14a and the non-solid area 14b. For example, the cross-sectional shape of the protrusion 60 above the opening 14b2 has the same shape as that of the opening 14b2, and is cross-shaped in this example.

As shown in FIG. 37(b), the cross-section of the protrusion 60 in a direction vertical to the substrate 11 is trapezoidal. Namely, the protrusion 60 has a top surface 60t parallel to the substrate plane and a side surface 60s inclining at a taper angle θ (<90°) with respect to the substrate plane. Since a vertical alignment film (not shown) is provided so as to cover the protrusion 60, the side surface 60s of the protrusion 60 has an orientation regulating force acting on the liquid crystal molecules 30a in the liquid crystal layer 30 in the same direction as the orientation regulating force provided by the oblique electric field. Thus, the protrusion 60 acts so as to stabilize the radially inclined orientation of the liquid crystal molecules 30a.

Figure 38:
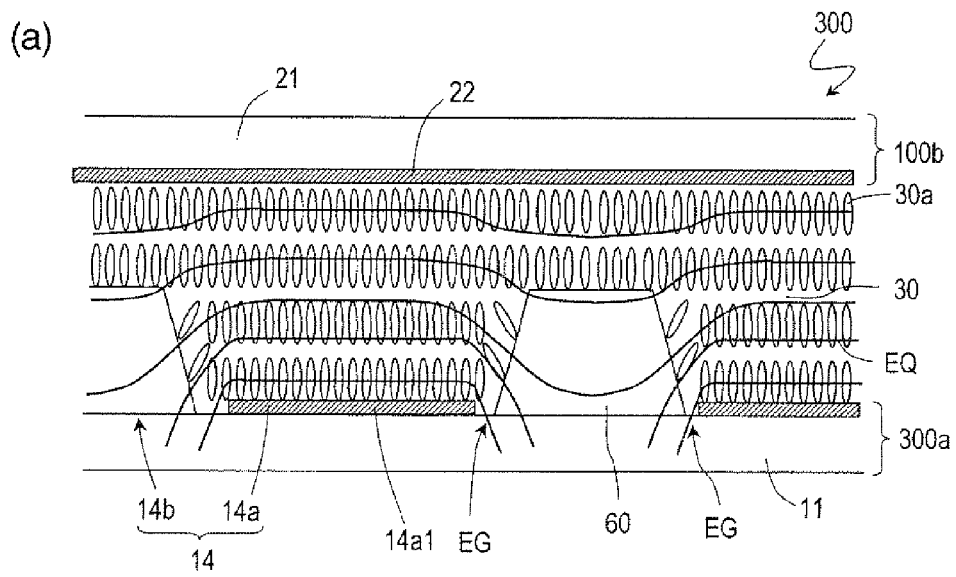
FIGS. 38(a) and (b) show a state where a voltage is applied to a liquid crystal layer 30 of the liquid crystal display device 300; (a) schematically shows a state where the orientation has just started to change (initial ON state), and (b) schematically shows a steady state.
Figure 38:
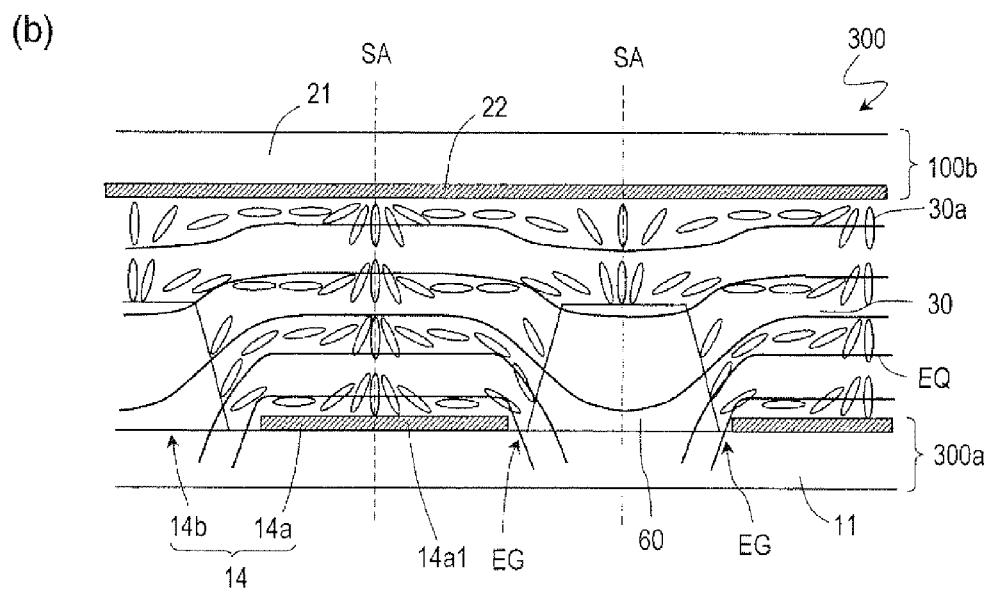

FIGS. 38(a) and (b) each show a state where a voltage is applied across the liquid crystal layer 30 shown in FIG. 37(b). FIG. 38(a) schematically shows a state where the orientation of the liquid crystal molecules 30a has just started to change (initial ON state) in accordance with the voltage applied across the liquid crystal layer 30. FIG. 38(b) schematically shows a state where the orientation of the liquid crystal molecules 30a, which has been changing in accordance with the applied voltage, has reached a steady state.

Where the picture element electrode 14 and the counter electrode 22 are at the same potential (where no voltage is applied across the liquid crystal layer 30), the liquid crystal molecules 30a in the picture element region are oriented vertical to the surface of each of the substrates 11 and 21 as shown in FIG. 37(b). In this state, the liquid crystal molecules 30a contacting the vertical alignment film (not shown) on the side surface 60s of the protrusion 60 are oriented vertical to the side surface 60s, and the liquid crystal molecules 30a in the vicinity of the side surface 60s are oriented as being inclined as shown in the figure by an interaction with the surrounding liquid crystal molecules 30a (by a property as an elastic body).

When a voltage is applied across the liquid crystal layer 30, a potential gradient represented by the equipotential lines EQ shown in FIG. 38(a) is generated. In a region of the liquid crystal layer 30 which is between the solid area 14a of the picture element electrode 14 and the counter electrode 22, the equipotential lines EQ are parallel to the surfaces of the solid area 14a and the counter electrode 22. The equipotential lines EQ drop in a region corresponding to the non-solid area 14b of the picture element electrode 14. As a result, an oblique electric field represented by an inclined portion of the equipotential lines EQ is generated in a region of the liquid crystal layer 30 above each edge EG of the non-solid area 14b (a peripheral portion within the non-solid area 14b including the boundary between the non-solid area 14b and the solid area 14a).

By the oblique electric field, as described above, the liquid crystal molecules 30a above a right (in the figure) edge EG incline (rotate) clockwise, and the liquid crystal molecules 30a above a left (in the figure) edge EG incline (rotate) counterclockwise. As a result, the liquid crystal molecules 30a above the edges are oriented parallel to the corresponding portions of the equipotential lines EQ. The orientation regulating direction by the oblique electric field is the same as the orientation regulating direction by the side surface 60s located at the respective edge EG.

As described above, the change in the orientation of the liquid crystal molecules 30a starts with those located on the inclined portion of the equipotential line EQ and proceeds to reach a steady state, which is schematically shown in FIG. 38(b). The liquid crystal molecules 30a located at, or in the vicinity of, the center of the opening 14b2, i.e., the liquid crystal molecules 30a located at, or in the vicinity of, the center of the top surface 60t of the protrusion 60 are influenced substantially equally by the orientation of the liquid crystal molecules 30a above the edges EG facing each other on both sides of the opening 14b2, and therefore are kept oriented perpendicular to the equipotential lines EQ. By contrast, the liquid crystal molecules 30a away from the center of the opening 14b2 (top surface 60t of the protrusion 60) incline by the influence of the orientation of the liquid crystal molecules 30a at a closer edge EG. As a result, an inclined orientation state which is symmetric with respect to the center SA of the opening 14b2 (top surface 60t of the protrusion 60) is formed. Also in a region corresponding to the unit solid area 14a1 substantially surrounded by the opening 14b2 and the protrusion 60, an inclined orientation state which is symmetric with respect to the center SA of the unit solid area 14a1 is formed.

As described above, liquid crystal domains exhibiting a radially inclined orientation are formed in correspondence with the opening 14b2 and the unit solid area 14a1. The side surface of the protrusion 60 provided above the non-solid area 14b acts to incline the liquid crystal molecules 30a in the vicinity of the edge EG of the non-solid area 14b in the same orientation direction as that provided by the oblique electric field, and thus stabilizes the radially inclined orientation. Accordingly, the liquid crystal display device 300 in this embodiment is strong against an external force, and so is preferably usable for personal computers and PDAs which are often carried around for use.

Where the protrusion 60 is formed of a highly transparent dielectric material, there is an advantage that the contribution of the liquid crystal domain formed in correspondence with the opening 14b2 to the display is improved. By contrast, where the protrusion 60 is formed of an opaque dielectric material, there is an advantage that light leaks, which would be caused by retardation of the liquid crystal molecules 30a oriented as being inclined by the side surface 60s of the protrusion 60, can be prevented. Which material is to be used may be determined based on the use of the liquid crystal display device or the like. In either case, it is advantageous to use a light-sensitive resin because use of such a resin can advantageously omit the step of patterning the material in correspondence with the non-solid area 14b. In order to obtain a sufficient orientation regulating force, when the thickness of the liquid crystal molecules 30 is about 3 μm, the height of the protrusion 60 is preferably in the range of about 0.5 μm to about 2 μm. In general, the height of the protrusion 60 is preferably in the range of about ⅙ to about ⅔ of the thickness of the liquid crystal molecules 30.

In the liquid crystal display device 300 in this embodiment also, as shown in FIG. 37(a), the unit solid area 14a1 is located such that the longitudinal direction thereof is generally parallel to direction D1 for which a high viewing angle characteristic is required. Therefore, a high viewing angle characteristic is realized for direction D1.

The pattern of the non-solid area 14b, above which the protrusion 60 is formed in order to stabilize the radially inclined orientation, is not limited to the pattern shown in this embodiment. The formation of the protrusion 60 is applicable to any pattern of the non-solid area 14b described above, and substantially the same effect is provided.

As a result of a detailed study on the relationship between the location of the protrusion 60 and the stability of the radially inclined orientation, the present inventor found that a stable radially inclined orientation is obtained by a structure in which the protrusion 60 covers the edges of the solid area 14a, regardless of the driving voltage.

Figure 39:
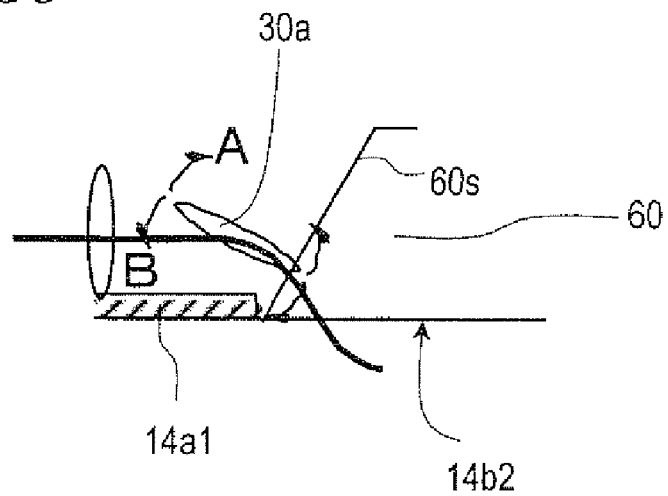
FIGS. 39(a) and (b) illustrate a preferable arrangement of a non-solid area of the picture element electrode and a protrusion.
Figure 39:
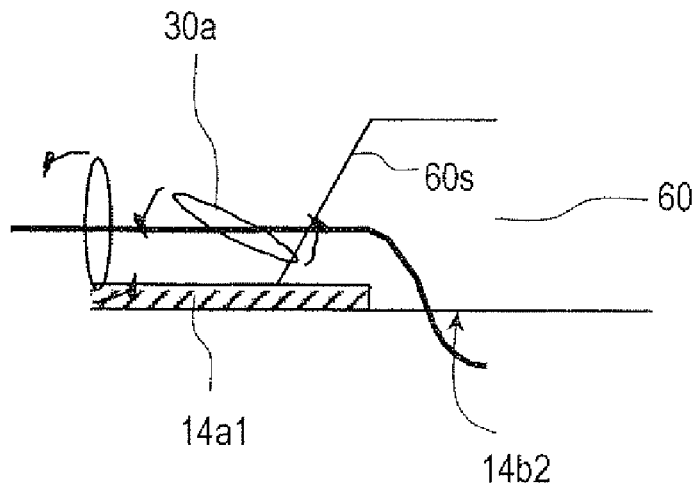

Hereinafter, the reason for this will be described with reference to FIGS. 39(a) and (b). FIG. 39(a) shows, in enlargement, an area in the vicinity of the protrusion 60 which does not cover the edge of the solid area 14a. FIG. 39(a) shows, in enlargement, an area in the vicinity of the protrusion 60 which covers the edge of the solid area 14a. FIGS. 39(a) and (b) show a state immediately after a voltage is applied across the liquid crystal layer 30.

In FIG. 39(a), the entirety of the protrusion 60 is formed within the opening 14b2, and the bottom surface of the protrusion 60 is smaller than the opening 14b2. In this structure, the side surface 60s of the protrusion 60 is above the edge of the opening 14b2. Therefore, the liquid crystal molecules 30a in the vicinity of the side surface 60s of the protrusion 60 are located on an inclined portion of the equipotential lines EQ in the presence of an applied voltage. In the example shown here, the axial direction of the liquid crystal molecules 30a oriented vertical to the side surface 60s is substantially parallel to the inclined portion of the equipotential lines EQ. Therefore, substantially no torque acts on the liquid crystal molecules 30a to change the orientation direction.

However, when a higher voltage is applied than in the example shown here, the equipotential lines EQ drop more drastically above the opening 14b2 (i.e., the inclination of the equipotential lines EQ is more steep). Therefore, a torque acts to incline the liquid crystal molecules 30a, which are oriented vertical to the side surface 60s, clockwise (in the direction of A in the figure).

When a lower voltage is applied than in the example shown here, the equipotential lines EQ drop less above the opening 14b2 (i.e., the inclination of the equipotential lines EQ is milder). Therefore, a torque acts to incline the liquid crystal molecules 30a, which are oriented vertical to the side surface 60s, counterclockwise (in the direction of B in the figure).

As described above, where the entirety of the protrusion 60 is located within the opening 14b2, the direction of torque acting on the liquid crystal molecules 30a oriented vertical to the side surface 60s of the protrusion 60 varies in accordance with the level of the applied voltage. Thus, the orientation may be disturbed depending on the driving voltage.

By contrast, in FIG. 39(b), the protrusion 60 covers the edge (outer periphery) of the solid area 14a (unit solid area 14a1) of the picture element electrode 14. In this structure, the side surface 60s of the protrusion 60 can be located above the solid area 14a (unit solid area 14a1), not above the opening 14b2. Therefore, the liquid crystal molecules 30a in the vicinity of the side surface 60s of the protrusion 60 can be located on a parallel portion of the equipotential lines EQ in the presence of an applied voltage. In this case, the direction of torque acting on the liquid crystal molecules 30a oriented vertical to the side surface 60s in the presence of an applied voltage is uniquely determined regardless of the level of the applied voltage (in the example show here, counterclockwise). Thus, a stable radially inclined orientation is obtained regardless of the driving voltage. In this example, the protrusion 60 is described as being provided above the opening 14b2, but the same is applicable to a protrusion provided above the cutout area 14b1.

There is no specific limitation on the width of a portion in which the protrusion 60 and the solid area 14a overlap. The width is preferably set in consideration of the positional error of the protrusion 60 and the solid area 14a which may occur during the production; more specifically, such that the protrusion 60 still covers the edges of the solid area 14a even if the positional error occurs (e.g., about 2 μm).

Embodiment 4

Figure 40:
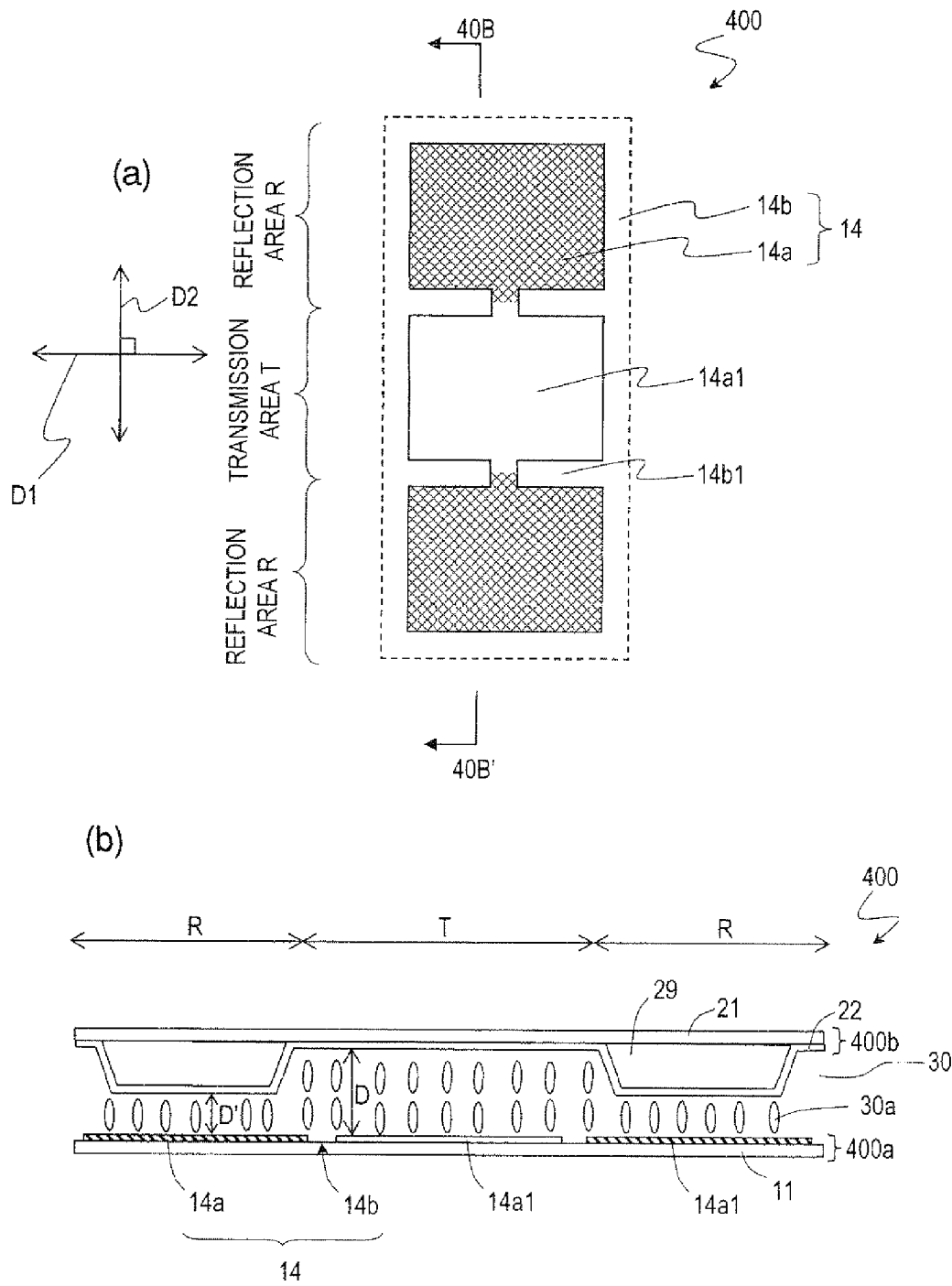
FIGS. 40(a) and (b) schematically show a structure of one picture element region of still another liquid crystal display device 400 according to the present invention; (a) is a plan view, and (b) is a cross-sectional view taken along line 40B-40B' in (a).

So far, the present invention has been described with transmissive liquid crystal display devices. The present invention is preferably applicable also to a reflective liquid crystal display device or transreflective liquid crystal display device. FIGS. 40(a) and (b) show a transreflective liquid crystal display device 400.

In the liquid crystal display device 400 shown in FIGS. 40(a) and (b), a picture element region includes a transmission area T for providing transmission mode display using light incident from the side of a TFT substrate 400a (typically, light from the backlight) and a reflection area R for providing reflection mode display using light incident from the side of a counter substrate 400b (typically, external light).

Typically, the picture element electrode 14 includes a transparent electrode formed of a transparent conductive material (e.g., ITO) and a reflective electrode formed of a light-reflective conductive material (e.g., aluminum). The transmission area T is defined by the transparent electrode, and the reflection area R is defined by the reflective electrode. Where a surface of the reflective electrode has minute concaved and convexed portions, light can be reflected in a diffusive manner by the reflective electrode. Thus, white display closer to white paper can be realized.

For the transmission mode display, light used for the display passes through the liquid crystal layer 30 only once. By contrast, for the reflection mode display, light used for the display passes through the liquid crystal layer 30 twice. In FIG. 40(b), thickness D' of the liquid crystal layer 30 in the reflection area R is made smaller than thickness D of the liquid crystal layer 30 in the transmission area T. By this arrangement, the retardation given by the liquid crystal layer 30 to the light used for the reflection mode can be closer to the retardation given by the liquid crystal layer 30 to the light used for the transmission mode. Where thickness D' of the liquid crystal layer 30 in the reflection area R is about ½ of thickness D of the liquid crystal layer 30 in the transmission area T, the retardation given by the liquid crystal layer 30 to the light used for both display modes can be made generally equal.

In this embodiment, a transparent dielectric layer 29 is provided on the counter substrate 400b selectively the reflection area R to form a step on a surface of the counter substrate 400b. Owing to this structure, thickness D' of the liquid crystal layer 30 in the reflection area R is made smaller than thickness D of the liquid crystal layer 30 in the transmission area T. Namely, the liquid crystal display device 400 realizes a multi-gap structure by forming a step on the counter substrate 400b. The multi-gap structure may be realized by forming a step on the TFT substrate 400a instead of the counter substrate 400b.

In the liquid crystal display device 400 in this embodiment having the above-described structure also, as shown in FIG. 40(a), the unit solid area 14a1 is located such that the longitudinal direction thereof is generally parallel to direction D1 for which a high viewing angle characteristic is required. Therefore, a high viewing angle characteristic is realized for direction D1.

INDUSTRIAL APPLICABILITY

The present invention can reduce the viewing angle dependence of the γ characteristic in a predetermined direction in a liquid crystal display device of the CPA mode. The present invention is preferably usable for various display devices which are required to have a high viewing angle characteristic in a particular direction, for example, display devices for various electronic devices such as a liquid crystal TV and the like.

The invention claimed is:

1. A liquid crystal display device usable for a use in which a viewing angle characteristic in a first direction parallel to a display plane is higher than a viewing angle characteristic in a second direction which is parallel to the display plane and is perpendicular to the first direction, the liquid crystal display device comprising:
    a first substrate; a second substrate; and a liquid crystal layer provided between at least the first substrate and the second substrate; wherein:
    a plurality of picture element regions are each defined by a first electrode supported by the first substrate, and a second electrode supported by the second substrate and facing the first electrode with the liquid crystal layer interposed therebetween;
    in each of the plurality of picture element regions, the first electrode includes a solid area formed of a conductive film and a non-solid area with no conductive film; and the liquid crystal layer forms a plurality of first liquid crystal domains, which exhibit a vertical orientation state when no voltage is applied between the first electrode and the second electrode, and each of which exhibits a radially inclined orientation state at least above the solid area of the first electrode by an oblique electric field generated in the vicinity of the solid area when a voltage is applied between the first electrode and the second electrode;
    the solid area of the first electrode includes a plurality of unit solid areas, above each of which each of the plurality of first liquid crystal domains is formed; and
    the plurality of unit solid areas each have a shape with which length $L_1$ in the first direction is greater than length $L_2$ in the second direction; and
    wherein said first electrode, which has the solid and non-solid areas, is a pixel electrode supported by the first substrate which is a TFT substrate, and the second electrode is a counter electrode supported by the second substrate which is a color filter substrate.

2. The liquid crystal display device of claim 1, wherein the plurality of unit solid areas are each generally rectangular.

3. The liquid crystal display device of claim 1, wherein the plurality of unit solid areas are each generally rectangular with generally arced corners.

4. The liquid crystal display device of claim 1, wherein in each of the plurality of unit solid areas, the ratio $L_1/L_2$ between length $L_1$ in the first direction and length $L_2$ in the second direction is 1.5 or greater.

5. The liquid crystal display device of claim 1, wherein in each of the plurality of unit solid areas, the ratio $L_1/L_2$ between length $L_1$ in the first direction and length $L_2$ in the second direction is 2.2 or less.

6. The liquid crystal display device of claim 1, wherein the liquid crystal layer forms at least one second liquid crystal domain which exhibits a radially inclined orientation state above the non-solid area by the oblique electric field when a voltage is applied between the first electrode and the second electrode.

7. The liquid crystal display device of claim 1, wherein the non-solid area of the first electrode includes at least one opening.

8. The liquid crystal display device of claim 1, wherein the non-solid area of the first electrode includes at least one cutout area.

9. The liquid crystal display device of claim 1, wherein in each of the plurality of picture element regions, the non-solid area of the first electrode has a surface area which is smaller than a surface area of the solid area of the first electrode.

10. The liquid crystal display device of claim 1, wherein the second substrate includes an orientation regulating structure in a region corresponding to at least one of the plurality of first liquid crystal domains, wherein the orientation regulating structure expresses an orientation regulating force for putting liquid crystal molecules in the at least one liquid crystal domain into a radially inclined orientation state at least in the presence of an applied voltage.

11. The liquid crystal display device of claim 10, wherein the orientation regulating structure is at least one first protrusion protruding from the second substrate into the liquid crystal layer.

12. The liquid crystal display device of claim 1, wherein the first substrate includes at least one second protrusion, which is at least partially located above the non-solid area; a cross-sectional shape of the second protrusion in an in-plane direction of the first substrate is conformed to a shape of a boundary between the solid area and the non-solid area; and a side surface of the second protrusion has an orientation regulating force acting on liquid crystal molecules in the liquid crystal layer in the same direction as an orientation regulating direction provided by the oblique electric field.

13. The liquid crystal display device of claim 1, wherein the picture element region has a transmission area for providing transmission mode display and a reflection area for providing reflection mode display.

14. The liquid crystal display device of claim 13, wherein the first electrode includes a transparent electrode for defining the transmission area and a reflective electrode for defining the reflection area.

15. The liquid crystal display device of claim 1, which comprises a pair of polarization plates located to face each other with the liquid crystal layer interposed between, wherein transmission axes of the pair of polarization plates are generally perpendicular to each other, and one of the transmission axes is generally parallel to the first direction.

16. An electronic device, comprising the liquid crystal display device of claim 1.

17. The electronic device of claim 16, further comprising a circuit for receiving television broadcast, wherein the plurality of unit solid areas are each located such that a longitudinal direction thereof is generally parallel to a horizontal direction of the display plane.

18. The liquid crystal display device of claim 1, wherein said pixel electrode comprises a plurality of solid areas and a plurality of non-solid areas, and wherein said plurality of solid areas of the pixel electrode are located in the same plane.

* * * * *